(12) United States Patent
Lee et al.

(10) Patent No.: US 9,892,120 B2
(45) Date of Patent: Feb. 13, 2018

(54) METHOD FOR MANAGING USAGE HISTORY OF E-BOOK AND TERMINAL PERFORMING THE METHOD

(75) Inventors: Taesung Lee, Gyeonggi-Do (KR); Eunkyung Kim, Gyeonggi-Do (KR); Taehyun Lim, Gyeonggi-Do (KR); Jooil Lee, Gyeonggi-Do (KR); Hyesook Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 587 days.

(21) Appl. No.: 13/089,197

(22) Filed: Apr. 18, 2011

(65) Prior Publication Data

US 2012/0005617 A1 Jan. 5, 2012

(30) Foreign Application Priority Data

Jun. 30, 2010 (KR) ........................ 10-2010-0063043

(51) Int. Cl.
*G06F 17/30* (2006.01)
*G06F 3/0483* (2013.01)

(52) U.S. Cl.
CPC ...... *G06F 17/30058* (2013.01); *G06F 3/0483* (2013.01); *G06F 17/30038* (2013.01); *G06F 17/30056* (2013.01)

(58) Field of Classification Search
CPC .. G06F 3/0481; G06F 3/0482; G06F 11/3058; G06F 17/30058; G06F 3/0483; G06F 17/30038; G06F 17/30056
USPC ........................................ 715/776, 745, 864
See application file for complete search history.

(56) References Cited

U.S. PATENT DOCUMENTS

| | | | | |
|---|---|---|---|---|
| 5,696,982 | A * | 12/1997 | Tanigawa et al. | 715/803 |
| 6,947,922 | B1 | 9/2005 | Glance | |
| 8,208,893 | B1 * | 6/2012 | Ryan | H04L 12/10 |
| | | | | 455/405 |
| 8,423,889 | B1 * | 4/2013 | Zagorie | G06F 17/21 |
| | | | | 715/255 |
| 8,510,247 | B1 * | 8/2013 | Kane, Jr. | G06N 5/02 |
| | | | | 706/46 |
| 2002/0019950 | A1 * | 2/2002 | Huffman et al. | 713/300 |
| 2002/0130847 | A1 * | 9/2002 | Conzola | G06F 3/0488 |
| | | | | 345/173 |
| 2004/0201633 | A1 | 10/2004 | Barsness et al. | |
| 2006/0282797 | A1 * | 12/2006 | Barsness | G06F 17/30716 |
| | | | | 715/864 |
| 2008/0214157 | A1 | 9/2008 | Ramer et al. | |
| 2010/0041391 | A1 * | 2/2010 | Spivey | H04W 12/10 |
| | | | | 455/425 |
| 2010/0092095 | A1 * | 4/2010 | King | G06F 17/3061 |
| | | | | 382/229 |

(Continued)

OTHER PUBLICATIONS

European Patent Office Application Serial No. 11161602.5 Search Report dated Jun. 18, 2013, 6 pages.

(Continued)

*Primary Examiner* — Amy M Levy
(74) *Attorney, Agent, or Firm* — Lee, Hong, Degerman, Kang & Waimey

(57) ABSTRACT

A method of managing a usage history of a mobile terminal is provided. The method includes generating a reading number regarding an e-book that is read, storing the generated reading number, and displaying the stored reading number based on a user setup.

18 Claims, 18 Drawing Sheets

(56) References Cited

U.S. PATENT DOCUMENTS

2012/0210203 A1\* 8/2012 Kandekar et al. ............ 715/230
2012/0311438 A1\* 12/2012 Cranfill et al. ............... 715/256
2013/0291126 A1\* 10/2013 Thomson .......... G06F 17/30014
　　　　　　　　　　　　　　　　　　　　　　　　726/30

OTHER PUBLICATIONS

Pineapple King, "It is not hard to make good use of Google Reader", Computer knowledge and skill (Experience Skill), No. 8, Aug. 2009, 2 pages.
The State Intellectual Property Office of the People's Republic of China Application Serial No. 201110144987.0, Office Action dated Jan. 29, 2013, 6 pages.
Korean Intellectual Property Office Application Serial No. 10-2010-0063043, Notice of Allowance dated Nov. 24, 2016, 5 pages.

\* cited by examiner

FIG. 2

CONTENTS

| | | |
|---|---|---|
| 1 Introduction | 1 | 6 |
|   1.1 Formatting of Optional Features................1 | | 6 |
|   1.2 What is the OpenGL Graphics system?.........1 | | 5 |
|   1.3 Programmer's View of OpenGL....................2 | | 6 |
|   1.4 Implementor's View of OpenGL...................2 | | 7 |
|   1.5 Our View....................................................3 | | 8 |
|   1.6 Companion Documents..................................3 | | 3 |
| 2 OpenGL Operation | 4 | 1 |
|   2.1 OpenGL Fundamentals..................................4 | | 1 |
|       2.1.1 Floating-Point Computation.................6 | | 2 |
|   2.2 GL State....................................................6 | | 3 |
|   2.3 GL Command Syntax....................................7 | | 8 |
|   2.4 Basic GL Operation....................................10 | | 6 |
|   2.5 GL Errors..................................................11 | | 6 |
|   2.6 Begin/End Paradigm..................................12 | | 11 |
|       2.6.1 Begin and End....................................15 | | 10 |
|       2.6.2 Polygon Edges....................................19 | | 12 |
|       2.6.3 GL Commands within Begin/End..........19 | | 9 |
|   2.7 Vertex Specification...................................20 | | 0 |
|   2.8 Vertex Arrays............................................23 | | 0 |
|   2.9 Buffer Objects...........................................33 | | 1 |
|       2.9.1 Vertex Arrays in Buffer Objects...........38 | | 2 |
|       2.9.2 Array Indices in Buffer Objects...........39 | | 3 |
|   2.10 Rectangles..............................................39 | | 6 |
|   2.11 Coordinate Transformations.......................40 | | 4 |
|       2.11.1 Controlling the Viewport....................41 | | 6 |
|       2.11.2 Matrices...........................................42 | | 8 |
|       2.11.3 Normal Transformation......................48 | | 6 | i

FIG. 3

CONTENTS

| | |
|---|---|
| 1 Introduction | 1 |
| 1.1 Formatting of Optional Features | 1 |
| 1.2 What is the OpenGL Graphics system? | 1 |
| 1.3 Programmer's View of OpenGL | 2 |
| 1.4 Implementor's View of OpenGL | 2 |
| 1.5 Our View | 3 |
| 1.6 Companion Documents | 3 |
| 2 OpenGL Operation | 4 |
| 2.1 OpenGL Fundamentals | 4 |
| 2.1.1 Floating-Point Computation | 6 |
| 2.2 GL State | 6 |
| 2.3 GL Command Syntax | 7 |
| 2.4 Basic GL Operation | 10 |
| 2.5 GL Errors | 11 |
| 2.6 Begin/End Paradigm | 12 |
| 2.6.1 Begin and End | 15 |
| 2.6.2 Polygon Edges | 19 |
| 2.6.3 GL Commands within Begin/End | 19 |
| 2.7 Vertex Specification | 20 |
| 2.8 Vertex Arrays | 23 |
| 2.9 Buffer Objects | 33 |
| 2.9.1 Vertex Arrays in Buffer Objects | 38 |
| 2.9.2 Array Indices in Buffer Objects | 39 |
| 2.10 Rectangles | 39 |
| 2.11 Coordinate Transformations | 40 |
| 2.11.1 Controlling the Viewport | 41 |
| 2.11.2 Matrices | 42 |
| 2.11.3 Normal Transformation | 48 | i

METHOD FOR MANAGING USAGE HISTORY OF E-BOOK AND TERMINAL PERFORMING THE METHOD

RELATED APPLICATION

Pursuant to 35 U.S.C. § 119(a), this application claims the benefit of earlier filing date and right of priority to Korean Application No. 10-2010-0063043, filed on Jun. 30, 2010, the contents of which is incorporated by reference herein in its entirety.

1. Field of the Invention

Embodiments disclosed herein relate to an e-book (or electronic book), and more particularly, to a method of managing the usage history of an e-book and a terminal performing the method.

2. Description of the Related Art

Terminals may be categorized as mobile/portable terminals or stationary terminals according to their mobility. Also, a mobile terminal may be categorized as a handheld terminal or a vehicle mount terminal according to the manner of portability.

As it becomes more multifunctional, the terminal can be configured to capture still images or moving images, play music or video files, play games, and receive broadcast signals, so as to be implemented as an integrated multimedia player. Various modifications to the terminal (to its hardware or software) have been implemented in order to support and implement such complicated functions.

In general, a conventional terminal capable of facilitating viewing of digital contents (for example, study books, papers, and literary novels) such as an e-book provides functions such as content reading, enlargement or reduction of a content screen, creation of a bookmark allowing fast page movement, and creation of a memo or note.

However, a conventional terminal does not provide various usage histories of digital contents, for example, detailed information on a portion of the e-book that has been read, and a number/time/location by/at which each region/page/unit has been read. As a result, a user or third party may be unable to obtain detailed statistical information regarding e-book usage history. The user or third party may also be unable to use various application services that can be derived from the e-book usage history.

SUMMARY

Embodiments of the present invention are directed toward a method of effectively providing the usage history of digital contents to a user and a terminal performing (or implementing) the method. Particular embodiments are directed toward a method of effectively providing filtered contents of an e-book (or electronic book) using the usage history of the e-book to a user and a terminal performing the method. Particular embodiments are directed toward a method of effectively sharing the usage history of an e-book between users and a terminal performing the method.

According to one embodiment, a method of managing a usage history of a mobile terminal includes: generating a reading number related to an e-book that is read; storing the generated reading number; and displaying the stored reading number based on a user setup.

The reading number may be generated for each reading item of the e-book. The reading item may be at least a region, a page or a unit of the e-book. The reading number may be generated when a history information generation condition is satisfied. The history information generation condition may correspond to whether a specific reading region of the e-book is displayed for more than a predetermined time.

The generating step may further generate at least a reading location, a reading duration, a reading time, or an indicator regarding a selected region, a displayed region, or an inserted multimedia object. The method of managing the history of a mobile terminal may further include displaying a filtering menu including a plurality of option items corresponding to the displayed reading number, and displaying a reading item of the e-book chosen based on the selected option item.

The method of managing the history of a mobile terminal may further include transmitting the generated reading number or statistical information generated based on the reading number to a predetermined server or another mobile terminal.

According to one embodiment, a mobile terminal includes: a controller configured to generate a reading number related to an e-book that is read; a memory configured to store the generated reading number; and a display unit controllable by the controller and configured to display the stored reading number based on a user setup.

A method of managing the usage history of an e-book according to at least one embodiment of the present disclosure and a terminal performing the same method as described above, effectively provides various usage histories of the e-book to an e-book user. A filtering function based on metadata for the usage history of the e-book may be provided to enhance convenience of usage. Also, various e-book related application services are facilitated through the function of sending and/or receiving metadata to and/or from another user.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain principles of the invention.

In the drawings:

FIG. 2 is a view of a contents page of an e-book illustrating the number of times that each unit has been read using numerals according to one embodiment of the present invention;

FIG. 3 is a view of a contents page of an e-book illustrating the number of times that each unit has been read using bar graphs according to one embodiment of the present invention;

DETAILED DESCRIPTION

Embodiments of the present disclosure will be described below in detail with reference to the accompanying drawings. Components labeled using the same reference number in multiple drawings are either the same or similar to each other, and disclosure provided regarding components with reference to one drawing may apply to components illustrated in other drawings.

In the following disclosure, if it is considered that a detailed explanation of a related known function or structure would be unnecessary, such explanation is not provided, but it is appreciated that such function or structure would be understood by those skilled in the art. In the following description, usage of suffixes such as 'module', 'part' or 'unit' used for referring to elements is given merely to facilitate explanation of the present disclosure, without having any significant meaning by themselves. The accompanying drawings of the present disclosure aim to facilitate understanding of the present disclosure and should not be construed as limiting the scope of the present disclosure.

General Configuration of Mobile Terminal

The mobile terminal described in the present disclosure may be a mobile phone, a smart phone, a notebook computer, a digital broadcast receiver, a PDA (Personal Digital Assistant), a PMP (Portable Multimedia Player), or a navigation device. It would be understood by a person skilled in the art that the present disclosure can be also applicable to stationary terminals such as digital TVs and desktop computers.

Figure 1:
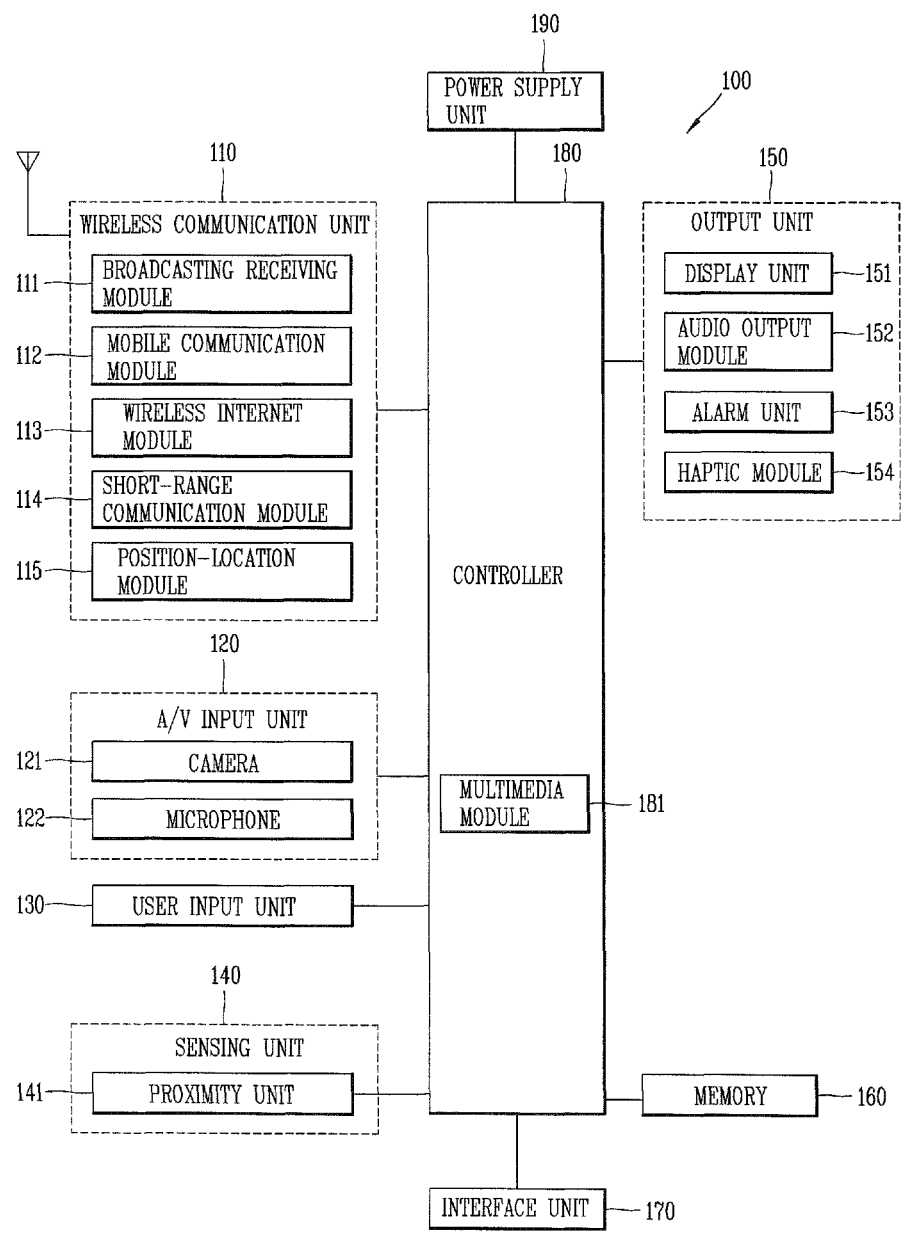
FIG. 1 is a block diagram of a mobile terminal according to an embodiment of the present invention.

FIG. 1 is a block diagram of a mobile terminal 100 according to an embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 as having various components, but it is understood that implementing all of the illustrated components is not a requirement. More or fewer components may be implemented according to various embodiments.

The wireless communication unit 110 typically includes one or more components facilitating radio communication between the mobile terminal 100 and a wireless communication system or network in which the mobile terminal is located. For example, the wireless communication unit 110 may include at least a broadcast receiving module 111, a mobile communication module 112, a wireless Internet module 113, a short-range communication module 114, or a position-location module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, accordingly, the broadcast associated information may be received by the mobile communication module 112. Broadcast signals and/or broadcast associated information received via the broadcast receiving module 111 may be stored in the memory 160 (or another storage medium).

The mobile communication module 112 transmits and/or receives radio signals to and/or from at least a base station (e.g., an access point, or a Node B), an external terminal (e.g., other user devices) or a server (or other network entities). Such radio signals may include a voice call signal or a video call signal. Such radio signals may carry various types of data relating to text and/or multimedia message transmission and/or reception.

The wireless Internet module 113 supports wireless Internet access for the mobile terminal 100. This module may be internally or externally coupled to the mobile terminal 100. The implemented wireless Internet technology may include WLAN (Wireless LAN), Wi-Fi, Wibro™ (Wireless broadband), Wimax™ (World Interoperability for Microwave Access), HSDPA (High Speed Downlink Packet Access), LTE (Long Term Evolution), and LTE-A (Long Term Evolution Advanced).

The short-range communication module 114 is a module for supporting short range communications. Some examples of short-range communication technology include Bluetooth™, Radio Frequency identification (RFID), Infrared Data Association (IrDA), Ultra-WideBand (UWB), and Zig-Bee™.

The position-location module 115 is for checking or acquiring a location (or position) of the mobile terminal 100. The position-location module may be a GPS (Global Positioning System) module.

With reference to FIG. 1, the NV input unit 120 receives an audio or image signal. The NV input unit 120 may include a camera 121 (or other image capture device) or a microphone 122 (or other audio pick-up device). The camera 121 processes image frames of still pictures or video which are obtained by an image capture device operating in a video capturing mode or an image capturing mode. The processed image frames may be displayed on a display unit 151 (or other output display device).

The image frames processed by the camera 121 may be stored in the memory 160 (or other storage medium) or transmitted to an external recipient via the wireless communication unit 110. Two or more cameras 121 may be provided according to various configurations of the mobile terminal.

The microphone 122 may capture sounds (audible data) while the mobile terminal is operating in a phone call mode, a recording mode, or a voice recognition mode. The microphone may process such sounds into electronic audio data. The processed audio (e.g., voice) data may be converted into a format transmittable to a mobile communication base station (or other network entity) via the mobile communication module 112 in a phone call mode. The microphone 122 may implement various types of noise canceling (or suppression) algorithms to cancel (or suppress) noise or interference generated in the course of receiving and transmitting audio signals.

The user input unit 130 (or other user input device) may generate input data responsive to commands entered by a user to control various operations of the mobile terminal. The user input unit 130 may include a keypad, a dome switch, a touch pad (e.g., a touch sensitive member that detects changes in resistance, pressure, or capacitance upon being touched), a jog wheel, or a jog switch.

The sensing unit 140 (or other detection unit) detects a current status (or state) of the mobile terminal 100. The detected status (or state) may include an opened or closed state of the mobile terminal 100, a location of the mobile terminal 100, the presence or absence of user contact with the mobile terminal 100 (i.e., touch inputs), the orientation of the mobile terminal 100, an acceleration or deceleration of the mobile terminal 100, or a direction of the mobile terminal 100.

The sensing unit 140 generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 may detect whether the power supply unit 190 is supplying power or whether the interface unit 170 is coupled with an external device. The sensing unit 140 may include a proximity unit 141.

The output unit 150 is configured to provide outputs in a visual, audible, and/or tactile manner (e.g., via an audio signal, an image signal, an alarm signal, or a vibration signal). The output unit 150 may include at least the display unit 151, an audio output module 152, an alarm unit 153, or a haptic module 154.

The display unit 151 may display (output) information processed in the mobile terminal 100. For example, when the mobile terminal 100 is operating in a phone call mode, the display unit 151 may display a User Interface (UI) or a Graphic User Interface (GUI) which includes information associated with a call. The display unit may also display a UI or a GUI which includes information associated with other forms of communication (such as text messaging or multimedia file downloading). When the mobile terminal 100 is operating in a video call mode or an image capturing mode, the display unit 151 may display a captured image and/or a received image, or a UI or GUI that shows videos or images and functions related to the display of the UI or GUI.

The display unit 151 may include at least a Liquid Crystal Display (LCD), a Thin Film Transistor-LCD (TFT-LCD), an Organic Light Emitting Diode (OLED) display, a flexible display, a three-dimensional (3D) display, or an e-ink display. Some of the displays (e.g., transparent displays) may be configured to be transparent or light-transmissive. A transparent display may be, for example, a TOLED (Transparent Organic Light Emitting Diode) display. In such a configuration, a user can see an object positioned at the rear of the terminal body on a portion of the display unit 151 of the terminal body.

The mobile terminal 100 may include two or more display units 151 (or other display devices) according to various embodiments. For example, a plurality of display units may be separately or integrally disposed on a single face of the mobile terminal 100, or may be disposed on different faces of the mobile terminal 100.

If the display unit 151 and a sensor (hereinafter referred to as a 'touch sensor') for detecting a touch operation are layered over each to form a touch screen, the display unit 151 may function as both an input device and an output device. The touch sensor may be configured as a touch film, a touch sheet, or a touch pad.

The touch sensor may convert pressure applied to a particular portion of the display unit 151 or a change in capacitance generated at a particular portion of the display unit 151 into an electrical input signal. The touch sensor may detect the pressure when a touch is applied, as well as the touched position and area.

When a touch input is applied to the touch sensor, a corresponding signal (signals) is transmitted to a touch controller. The touch controller processes the signal(s) and transmits corresponding data to the controller 180. Accordingly, the controller 180 may recognize which portion of the display unit 151 has been touched.

With reference to FIG. 1, a proximity unit 141 may be disposed within or near the touch screen. The proximity unit 141 is a sensor for detecting the presence or absence of an object relative to a certain detection surface or an object that exists (or is located) near the proximity unit 141 by using electromagnetic fields or infrared rays without physical contact. Thus, the proximity unit 141 has a considerably longer life span compared to a contact type sensor, and it can be utilized for various purposes.

Examples of the proximity unit 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. In case where the touch screen is the capacitance type, the proximity of a pointer is detected by a change in electric field according to the proximity of the pointer. In this configuration, the touch screen (touch sensor) may be considered as the proximity unit 141.

The audio output module 152 may convert and output sound audio data received from the wireless communication unit 110 or stored in the memory 160 when operating in a call signal reception mode, a call mode, a record mode, a voice recognition mode, or a broadcast reception mode. Also, the audio output module 152 may provide audible outputs related to a particular function performed by the mobile terminal 100 (e.g., a call signal reception sound or a message reception sound). The audio output module 152 may include a receiver, a speaker, a buzzer, or other sound generating device.

The alarm unit 153 (or other type of user notification unit) may provide outputs to inform a user of an occurrence of an event of the mobile terminal 100. Typical events may include a call reception, a message reception, key signal inputs, and a touch input. In addition to audio or video outputs, the alarm unit 153 may provide outputs in a different manner to inform the user about the occurrence of an event. For example, the alarm unit 153 may provide an output in the form of a vibration (or other tactile output or a output that can be sensed in a similar manner). When a call, a message, or some other incoming communication is received, the alarm unit 153 may provide tactile outputs (i.e., vibrations) to inform the user of the event. By providing such tactile outputs, the user can be alerted of the occurrence of various events even if the mobile phone is in the user's pocket. Outputs informing the user about the occurrence of an event may be also provided via the display unit 151 or the audio output module 152. The display unit 151 and the audio output module 152 may be classified as a part of the alarm unit 153.

The haptic module 154 generates various tactile effects the user may sense. A typical example of the tactile effects generated by the haptic module 154 is vibration. The strength and pattern of the haptic module 154 can be controlled. For example, different vibrations may be combined to be output or sequentially output. Besides vibration, the haptic module 154 may generate various other tactile effects such as an effect simulating a pin arrangement vertically moving against a contact skin surface, a spray force or suction force of air through a jet orifice or a suction opening, a contact on the skin surface, a contact of an electrode, electrostatic force, and an effect causing a cold or warm sensation using an element that can absorb or generate heat.

The haptic module 154 may be implemented to allow the user to feel a tactile effect through a muscle sensation of a finger or arm of the user, as well as to transfer the tactile effect through a direct contact. Two or more haptic modules 154 may be provided according to one embodiment of the mobile terminal 100.

The memory 160 may store software programs used for processing and controlling operations performed by the controller 180, and/or may temporarily store data (e.g., a phonebook, messages, still images, video) that is input or output. In addition, the memory 160 may store data regarding various patterns of vibrations and audio signals output when a touch is input to the touch screen.

The memory 160 may include at least one type of storage medium including a Flash memory, a hard disk, a micro-type multimedia card, a card-type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in association with a web storage device that performs the storage function of the memory 160 over the Internet.

The interface unit 170 serves as an interface with an external device connected with the mobile terminal 100. For example, the interface unit may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, and/or earphone ports.

The identification module (not shown) may be a chip that stores various information for authenticating a usage authority of the mobile terminal 100 and may include a user identity module (UIM), a subscriber identity module (SIM), and/or a universal subscriber identity module (USIM). In addition, a device having the identification module (referred to hereinafter as an 'identifying device') may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for indicating that the mobile terminal is properly mounted on the cradle.

The controller 180 typically controls the general operations of the mobile terminal 100. For example, the controller 180 performs control and processing associated with voice calls, data communications, and video calls. The controller 180 may include a multimedia module 181 for reproducing multimedia data. The multimedia module 181 may be configured within the controller 180 or may be implemented separate from the controller 180. The controller 180 may perform pattern recognition processing to recognize a handwriting input or a picture drawing input carried out on the touch screen as characters or images, respectively.

The power supply unit 190 receives external power or internal power and supplies appropriate power required for operating various elements and components under the control of the controller 180.

Various embodiments described herein may be implemented in a computer-readable or similar medium using, for example, software, hardware, or a combination of software and hardware. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such embodiments may be implemented by the controller 180 itself.

For software implementation, procedures or functions according to embodiments described herein may be implemented by separate software modules. Each software module may perform one or more functions or operations described herein. Software codes can be implemented by a software application written in any suitable programming language. The software codes may be stored in the memory 160 and executed by the controller 180.

Processing User Input with Respect to Mobile Terminal

The user input unit 130 is manipulated to receive a command for controlling the operation of the mobile terminal 100 and may include a plurality of manipulation units. The manipulation units may be generally referred to as manipulation portions, and various methods and techniques can be employed for providing the manipulation portions so long as they can be operated by the user in a tactile manner.

The display unit 151 may display various types of visual information. This information may be displayed in the form of characters, numerals, symbols, graphics or icons. In order to input such information, at least one of the characters, numerals, symbols, graphics and icons may be represented as part of a predetermined arrangement in the form of a keypad. Also, the keypad can be referred to as a 'soft key'. The display unit 151 may be operated via an entire area or divided regions. In the latter case, the plurality of regions may be configured to be operated in association with each other.

For example, an output window and an input window may be displayed, respectively, at an upper portion and a lower portion of the display unit 151. The output window and the input window are regions allocated to output and input information, respectively. Soft keys marked by numbers for inputting a phone number may be displayed in the input window. When a soft key is touched, a number corresponding to the touched soft key may be displayed on the output window. When the manipulation unit is manipulated, a call connection to the phone number displayed on the output window may be attempted, or text displayed on the output window may be input to an application.

The display unit 151 or a touch pad may be configured to receive a touch through scrolling. The user can move an entity displayed on the display unit 151 (for example, a cursor or a pointer positioned on an icon) by scrolling the touch pad. In addition, when the user moves his finger along the display unit 151 or along the touch pad, a path along which the user's finger moves may be visually displayed on the display unit 151. This can be useful in editing an image displayed on the display unit 151.

A certain function of the terminal may be executed when the display unit 151 (touch screen) and the touch pad are touched together within a certain time range. For example, the display unit 151 and the touch pad may be touched together when the user clamps the terminal body by using his thumb and index fingers. The certain function that is executed may be activation or deactivation of the display unit 151 or the touch pad.

Exemplary embodiments related to a control method that can be implemented in a terminal configured as described herein will now be described with reference to the accompanying drawings. The exemplary embodiments to be described may be used individually or in conjunction with one another. Also, the exemplary embodiments to be described may be used in conjunction with the user interface (UI) described herein.

Managing the Usage History of an E-Book and a Terminal Performing the Managing

In a broad sense, an electronic book or "e-book" is a publication in which the content of a book is processed and stored in the form of digital information. In a narrow sense, the term "e-book" may denote a file having a general format such as a text file, or a file having a specific format in which digital rights management (DRM) is employed to protect copyrights. In general, e-books can be read using a portable device (for example, a portable phone, a PMP, or a PDA) or a stationary device (for example, a desktop computer).

Embodiments described herein are directed to a method of storing various information related to e-book use, and providing statistical information on the use history of an e-book from the stored information or providing filtered e-book contents based on the stored information. According to particular embodiments, the user may select information to be stored, and the stored information is shared with other users, thereby serving various applications.

Specifically, a terminal according to an embodiment of the present invention may store the usage record or history and details of the usage record or history, such as a reading number (e.g., a number of viewing times), a reading time, or a reading location, for each content or for each reading item or portion of the content based on a user-selected storage setup. The reading item or portion may be a region, a page, or a unit (chapter) of the e-book. A region of the e-book may refer to at least a part of a page of the e-book.

A terminal according to an embodiment of the present invention may display contents usage information or display filtered contents on a contents/table of a contents/page/statistics screen based on usage history depending on a user-selected display setup. In addition, a terminal according to an embodiment of the present invention may provide/transmit usage information to a server or another external device to allow the contents usage history to be shared, to facilitate contents information exchange services based on the usage history, or to facilitate maintenance operations (e.g., deleting the stored usage history).

In this manner, a terminal according to an embodiment of the present invention may provide various usage histories of an e-book to the user to improve convenience of usage, and allow various e-book related application services to provide or receive e-book usage history information to or from another user.

Information related to e-book use may be understood as including an e-book usage record, e-book usage history, and information on e-book use. Information related to e-book use may also be understood as a kind of "metadata" from the standpoint of information related to e-book contents. Hereinafter, for convenience of description, the information related to e-book use may be referred to as "metadata." However, it is understood that aspects and features of this disclosure are not limited to embodiments described as employing or using "metadata."

Control methods that can be implemented in a terminal according to an embodiment of the present invention will be described with reference to a metadata setup function, a metadata storage function, a metadata display function, a contents filtering function based on metadata, a metadata transmission function, and a metadata management function.

Metadata Setup Function

If the display unit 151 displays various kinds of visual information related to an optional metadata setup, and the user input unit 130 transmits to the controller 180 input data corresponding to a user-selected setup (a setup selected by the user), then the controller 180 stores a metadata-related setup in the memory 160 corresponding to the user-selected setup. Then, the controller 180 reads the metadata-related setup stored in the memory 160, and stores or updates e-book usage history information in the memory 160 according to the metadata-related setup.

The metadata-related setup that can be stored in the memory 160 will now be described. The controller 180 may store in the memory 160 a setup related to whether to use a metadata storage function for the e-book usage history. The setup related to whether to store metadata may be applied to all e-books to be read in the mobile terminal 100 as a whole or may be applied individually for each e-book.

For example, if the display unit 151 displays a metadata storage setup icon while visually displaying any one e-book and the user input unit 130 transmits to the controller 180 input data corresponding to a user selection regarding the setup icon, then the controller 180 may store a metadata storage setup for the e-book in the memory 160.

Alternatively, if the display unit 151 (touch screen) visually displays any one e-book and the touch controller transmits to the controller 180 data corresponding to a touch input on the touch screen, then the controller 180 may perform pattern recognition processing capable of recognizing a handwriting input and a picture-drawing input carried out on the touch screen as a text and an image, respectively. The controller 180 may then store a metadata storage setup corresponding to the recognized text or image.

Alternatively, if the display unit 151 (touch screen) visually displays a list of at least one e-book and a metadata storage setup window and the touch controller transmits data to the controller 180 corresponding to a dragging of the listed e-book to the metadata storage setup window on the touch screen, then the controller 180 may store a metadata storage setup for the e-book in the memory 160.

If the controller 180 stores a setup related to whether to use the metadata storage function individually for each e-book, then the controller 180 checks whether metadata of the relevant e-book is stored in the memory 160 while loading the e-book. Then, the controller 180 transmits a control signal to allow the output unit 150 to output information indicating whether the metadata has been stored. The indication may be performed via a notification window, a sound, or some other indicator.

If the metadata has not been stored, then the controller 180 controls the display unit 151 to visually display a metadata setup screen or a query screen inquiring whether to generate metadata. The display unit 151 may indicate that metadata for the relevant e-book has been stored via an icon or text at a top end or a bottom end of the screen on which a page of the e-book is displayed.

The controller 180 may store a setup for a metadata storage condition in the memory 160. The metadata storage condition is a basis for determining whether a relevant page or specific region (or portion) of an e-book has been actually read by the user, and it may be configured to store only meaningful metadata. The setup for a metadata storage condition may be activated only when the previously described metadata storage function is activated.

For example, the display unit 151 visually displays any one page of an e-book, and, at the same time, the controller 180 starts a timer. If the period of time measured by the timer exceeds a user-selected time or a predetermined time (e.g., a time set by the manufacturer of the mobile terminal 100) without detecting a change in the page displayed, then the controller 180 determines that the page has been actually read. Accordingly, the controller 180 stores metadata for the page. If the user input unit 130 or the display unit 151 (touch screen) transmits input data to the controller 180 corresponding to the user-selected time, then the controller 180 may store a setup for the metadata storage condition in the memory 160.

Alternatively, if the display unit 151 visually displays any one page of an e-book and the user input unit 130 transmits to the controller 180 input data corresponding to a user input to a scroll manipulation module or the display unit 151 (touch screen) transmits to the controller 180 input data corresponding to the scroll input, then the controller 180 determines that the page has been actually read. The controller 180 then stores metadata for the page in the memory 160.

Alternatively, if the display unit 151 visually displays any one page of an e-book and the display unit 151 (touch screen) transmits to the controller 180 input data corresponding to the touch inputs (e.g., a number of touch inputs) greater than a predetermined number, then the controller 180 determines that the page has been actually read. The controller 180 then stores metadata for the page in the memory 160.

Furthermore, the controller 180 may store in the memory 160 a setup related to whether to store metadata identifying a page in which a specific type of multimedia content (for example, image, flash, video) is inserted. The controller 180 reads metadata stored in the memory 160, and accordingly performs filtering on a specific reading item or specific portion in which the specific type of multimedia content has been inserted. The controller 180 then controls the display unit 151 to display the filtered page or region. The specific reading item or specific portion may be a page or region of the e-book.

According to one embodiment, even if a setup is activated for storing metadata identifying a page in which a specific type of multimedia content has been inserted, and any one page includes such a type of multimedia content, the controller 180 may store in the memory 160 the metadata for the page only when the described metadata storage function and metadata storage condition setup are activated and the relevant page satisfies the metadata storage condition.

Furthermore, the controller 180 may store a setup related to whether to store in the memory 160 metadata identifying a region selected by the user (for example, a region to which an inverted display, an underlined display, a highlighted display, or an enlarged display are applied). The selected region may be part of or all of a page, and may include a plurality of separate regions. The metadata identifying the selected region may be represented in the form of a collection including a plurality of coordinates, and the coordinates may be a pair of pixel unit coordinates, e.g., (X, Y), on a screen displayed by the display unit 151.

For example, if the display unit 151 (touch screen) visually displays any one page of an e-book, and the touch controller transmits to the controller 180 data corresponding to a multi-touch input of the touch screen, then the controller 180 may send a control signal to control the display unit 151 (touch screen) to display an enlarged page region. The controller 180 determines that the enlarged page region is a region selected by the user and stores metadata in the memory 160 identifying the relevant region.

Alternatively, if the display unit 151 (touch screen) visually displays any one page of an e-book, and the touch controller transmits to the controller 180 data corresponding to a dragging input carried out on the touch screen, then the controller 180 may send a control signal to control the display unit 151 (touch screen) to invert the display of a page region selected by the dragging input. The controller 180 determines that the inverted displayed page region is a region selected by the user and stores metadata in the memory 160 identifying the relevant region.

Alternatively, if the display unit 151 (touch screen) visually displays any one page of an e-book, and the touch controller transmits to the controller 180 data corresponding to an underline input carried out on the touch screen, then the controller 180 may send a control signal to control the display unit 151 (touch screen) to invert the display of a page region selected by the underline input. The controller 180 determines that the inverted displayed page region is a region selected by the user and stores metadata in the memory 160 identifying the relevant region. The controller 180 may determine that a region included within a predetermined width (or distance) from the input underline along an upward direction is the selected region.

According to one embodiment, if a setup is activated for storing metadata identifying a page in which a specific type of multimedia content has been inserted, and any one page includes such a type of multimedia content, the controller 180 may store the metadata for the page in the memory 160 only when the previously described metadata storage function and metadata storage condition setup are activated and the relevant page satisfies the metadata storage condition.

According to one embodiment, the controller 180 may perform filtering only on the selected region of the e-book using metadata identifying the selected region in order to control the display unit 151 to display the selected region. If the display unit 151 displays a page including the selected region, then the controller 180 may transmit a control signal to control the display unit 151 to display the selected region to be visually distinguishable from other regions using metadata identifying the selected region. Furthermore, the controller 180 may store a setup for the metadata storage unit (i.e., an object for which metadata is stored) along with the e-book usage history information in the memory 160. The metadata storage unit may be a region, a page, a unit (chapter), or a book.

For example, if the metadata storage unit is a region, then the controller 180 may link a collection including a plurality of coordinates identifying a region with metadata related to the region for storage in the memory 160. If the metadata storage unit is a page, then the controller 180 may link a page number identifying a page with metadata related to the page for storage in the memory 160.

If the metadata storage unit is a unit (chapter), then the controller 180 may link a unit number identifying the unit (chapter) with metadata related to the unit for storage in the memory 160. If the metadata storage unit is a book, then the controller 180 may link an IBSN (International Standard Book Number) identifying a book or book title with metadata related to the book for storage in the memory 160.

Furthermore, the controller 180 may store a setup related to whether to store in the memory 160 metadata identifying a region displayed on a screen as selected by the user. The region displayed on the screen may be part of a page displayed on a screen as selected by a scroll function, an enlargement function, or a reduction function, for example, if the size of a page is greater than that of a screen. The metadata identifying the displayed region may be represented in the form of a collection including a plurality of coordinates, and the coordinates may be a pair of pixel unit coordinate, e.g., (X, Y), on a screen displayed by the display unit 151.

According to one embodiment, the controller 180 may perform filtering only on the displayed region of the e-book using metadata identifying the displayed region in order to control the display unit 151 to display the displayed region. If the display unit 151 displays a page including the displayed region, then the controller 180 may transmit a control signal to control the display unit 151 to display the displayed region (i.e., a region of the relevant page which is scrolled, enlarged, or reduced and displayed in the same manner as when previously read) using metadata identifying the displayed region.

According to one embodiment, even if a setup is activated for storing metadata identifying a region displayed on the screen, the controller 180 may store in the memory 160 the metadata for the page only when the previously described metadata storage function and metadata storage condition setup are activated and the relevant page satisfies the metadata storage condition.

Furthermore, the controller 180 may store a setup for indicating a specific user who receives e-book usage history information (for example, usage statistical information) or a filtering function based on metadata stored in the memory 160. The controller 180 may store a setup related to whether the e-book usage history information and/or the filtering function are to be provided to all users of the mobile terminal 100, or only to the indicated specific user.

If the mobile terminal 100 is used by a plurality of users and a first user is in a position of leading or supervising a second user, then such a setup may be useful where the first user should have authority to review information indicating that the second user has read an e-book. The first user may review this information using the mobile terminal 100, e.g., from the statistical information displayed on the display unit 151 of the mobile terminal 100. The second user should not have such authority (or capability). The mobile terminal 100 may receive a password for accessing the setup to distinguish the authorities of the first user and the second user. The password may be set by an initial user or subsequent user of the mobile terminal 100.

Furthermore, the controller 180 may store in the memory 160 a setup related to whether to store metadata for the location information (for example, GPS information) regarding a location at which an e-book is used. The controller 180 receives the GPS information regarding a current location of the mobile terminal 100 from the position-location module 115. The controller 180 links a location name provided in the form of data input via the user input unit 130 or a position selected on a map displayed on the display unit 151 (touch screen) with the GPS information for storage of the related metadata in the memory 160.

As will be described in more detail later, while the display unit 151 displays an e-book, the controller 180 compares current GPS information of the mobile terminal 100 (e.g., as provided from the position-location module 115) with GPS information registered in the metadata stored in the memory 160. The controller 180 determines that the e-book has been read at the relevant location registered in the metadata and stores the related metadata in the memory 160 if the location specified by the current GPS information is located within a predetermined range from the location specified by the GPS information registered in the metadata. When the controller 180 stores metadata for location information where an e-book is used, a time at which the reading location is specified may be a reading start time, a reading end time, or an intermediate time (average time) between the reading start and the reading end.

The controller 180 may transmit a control signal to perform filtering only on content that has been read at a specific location among the content portion of an e-book using the metadata specifying a reading location. The controller 180 then controls the display unit 151 to display the filtered content portion. The content portion may be a region, a page, or a unit.

The controller 180 may store a setup related to whether to store in the memory 160 metadata for a reading number, a reading duration, or a reading time. The reading time duration may take the form of day/hour/minute/second, and the reading time may take the form of year/month/day/hour/minute/second, or morning/afternoon/evening/night.

For example, if the display unit 151 visually displays any one page of an e-book while at the same time the controller 180 starts a timer, then the controller 180 may store a period (or length) of time in the memory 160. The period of time may be the duration between the time at which the page is displayed to a time at which the page displayed is turned to another page. The period of time may be generated as metadata taking the form of day/hour/minute/second.

Alternatively, as illustrated in the foregoing example, the controller 180 may store in the memory 160 a reading duration for each page of the e-book as metadata. The controller 180 may then store in memory 160 a reading duration for the relevant e-book which is the sum of reading durations for each page as metadata for the relevant e-book if all pages of the relevant e-book have been read.

Furthermore, the controller 180 may store in the memory 160 a setup related to whether to provide metadata for various e-book usage histories as described earlier to another user. If the setup is activated, then the wireless communication unit 110 may transmit part or all of the metadata stored in the memory 160 to a predetermined metadata server for transfer to another user, or directly transmit to the mobile terminal of another user. Also, the controller 180 may store a setup related to whether to receive metadata for various e-book usage histories as described earlier from another user and/or a setup related to whether the wireless communication unit 110 receives a notification message or the output unit 150 displays an indicator if metadata from another user is available.

If metadata for e-book usage histories is shared by the users or the mobile terminals 100, then various applications may be derived from or based on this information. For example, metadata transmitted from the mobile terminal 100 of a child or student to a metadata server may be read by schools or publishing companies to be used as education- or publication-related reference materials.

If a user provides his or her own metadata for any one e-book, then the user may receive a notification message recommending books that are similar to the user's e-book (e.g., favorites in the category of the user's e-book) and that have read more than a predetermined number of times or for longer than a predetermined time by other users. The metadata may thereby be used as a reference in selecting e-books.

The metadata server may store the favorite recommended e-books specified by a specialist for each e-book, and then, through a search and comparison process, choose e-books according to the category of an e-book that has read by the user. Also, the user may directly indicate the category of e-books that have been read or possessed by himself or herself, for example, in the form of a keyword.

Furthermore, the controller 180 may store in the memory 160 a setup related to whether to display metadata for e-book usage histories and/or statistical information based on the metadata on the UI (user interface) screen of the mobile terminal 100. When the setup is activated, the controller 180 may store in the memory 160 a setup for display of a metadata item or a statistical information item based on the metadata.

Metadata Storage Function

As described earlier, the controller 180 reads a metadata-related setup stored in the memory 160, and stores or updates metadata for e-book usage history in the memory 160 according to the metadata-related setup. Various kinds of metadata that can be stored in the memory 160 by the controller 180 have been described in association with the metadata setup function, and description of the metadata will not be repeated below.

The controller 180 may store metadata according to a region unit, page unit, chapter unit, or e-book (content) unit. As described previously, the controller 180 may store in the memory 160 a setup for the metadata storage unit with regard to e-book usage histories.

For example, if metadata is stored in the memory 160 according to a page unit (i.e., metadata is stored for each page), then the usage history for each page may be implemented in the form of a data structure configured with a collection of a plurality of metadata, or implemented in the form of one piece of metadata including a plurality of attributes or a plurality of fields. The metadata for one e-book may be implemented in the form of a data structure or database configured with the collection of a plurality of metadata regarding pages of the e-book.

With respect to each page of an e-book, the collection of a plurality of metadata stored in the memory 160 by the controller 180 may include whether a specific type of multimedia content has been inserted in each page, a collection including a plurality of coordinates identifying a region selected by the user in each page, a collection including a plurality of coordinates identifying a region displayed on the screen as selected by the user in each page, a location where each page is read, a reading number, reading time or reading duration of each page. Also, the described pieces of information may be stored in the memory 160 by the controller 180 as one piece of metadata including respective attributes or fields respectively corresponding to the pieces of information.

If metadata is stored in the memory 160 in the e-book unit (i.e., metadata is stored for each e-book), then the usage history for each e-book may be implemented in the form of a data structure configured with a collection of a plurality of metadata, or implemented in the form of one piece of metadata including a plurality of attributes or a plurality of fields. The metadata for at least one e-book stored in the mobile terminal 100 may be implemented in the form of a data structure or database configured with the collection of a plurality of metadata for multiple e-books.

With respect to each e-book, the collection of a plurality of metadata stored in the memory 160 by the controller 180 may include whether to store metadata for each e-book, a metadata storage condition, the identity of a user that can read metadata for each e-book usage history, a location where each e-book is read, a reading number, reading time or reading duration of each e-book, whether to provide metadata for each e-book usage history to another user, and whether to receive metadata for each e-book usage history from another user. The above-noted metadata may be stored in the memory 160 in the form of one piece of metadata including a plurality of attributes or a plurality of fields.

Metadata Display Function

As described above, the controller 180 reads a metadata-related setup stored in the memory 160, and stores or updates metadata for e-book usage history in the memory 160 according to the metadata-related setup. The controller 180 generates various statistical information for e-book usage histories based on the metadata that has been read from the memory 160, and generates a UI object (e.g., user interface object, UI constituent element). The UI object may include visual elements such as a numeral, text, an icon, an image, a character, a graph, a chart, a color, a luminance, a shade, a gradation, an inverted display, an underline, or a selection display. If the controller 180 transmits the generated UI object, then the display unit 151 visually displays the transmitted UI object.

The display unit 151 may display various types of graphs or charts supported by a typical spreadsheet program. For example, the display unit 151 may display a vertical bar chart, a horizontal bar chart, a line chart, a pie chart, a scatter chart, an area chart, a donut chart, a radial chart, a surface chart, or a 3-dimensional chart. The display unit 151 may control or change the display of a shape of a UI object in various ways. For example, in visual elements constituting a UI object, the font or size of a numeral or text may be controlled, the size or color of an image or character may be controlled, the type of a graph or chart may be changed, or the color of the graph or chart may be changed.

The control, modification or change of the UI object may be configured by the user. For this purpose, a typical process may be performed in which the display unit 151 displays a setup window, and the user input unit 130 or the display unit 151 (touch screen) receives the user selection to transmit the received data to the controller 180.

The UI object that can be visually displayed by the display unit 151 is now described in more detail. The display unit 151 may display a UI object indicating statistical information for each portion in the contents page of an e-book. Here, the portion may be a page or a unit (chapter). The display unit 151 may display a UI object indicating statistical information by overlaying it on the contents page of the e-book. More particularly, the display unit 151 may suitably control the transparency of the UI object to display it on the contents page.

For example, the display unit 151 may display on the contents page of an e-book a UI object including visual elements such as text, an icon, an image, a character, a color, or an inverted display. The UI object may indicate whether a specific type of multimedia content is inserted, or a location where the e-book is read. The display unit 151 may display a UI object including visual elements such as a numeral, text, an icon, an image, a character, a graph or a color. The UI object may indicate a reading number, reading time or reading duration on the contents page of an e-book.

FIG. 2 is a view of a display of a terminal according to an embodiment of the present invention. With reference to FIG. 2, the terminal displays the number of times that each unit has been read as a numeral on the contents page of an e-book. As illustrated in FIG. 2, the title of the unit (chapter) for each level and the start page of the unit (chapter) may be displayed on the contents page. Moreover, the number of times that the unit (chapter) has been read may be displayed as a numeral next to each start page. The displayed number may be a sum of the reading numbers of all pages constituting the unit (chapter), or may be a number of times that it is determined that all pages constituting the unit (chapter) have been read.

FIG. 3 is a view of a display of a terminal according to an embodiment of the present invention. With reference to FIG. 3, the terminal displays the number of times that each unit has been read as a bar graph on the contents page of an e-book. As illustrated in FIG. 3, the title of the unit (chapter) for each level and the start page of the unit (chapter) may be displayed on the contents page. Moreover, the number of times that the unit (chapter) has been read may be displayed as a bar graph next to each start page. The displayed number may be a sum of the reading numbers of all pages constituting the unit (chapter), or may be a number of times that it is determined that all pages constituting the unit (chapter) have been read. The height (or width) of the bar graph may be adjusted in proportion to the remaining reading numbers when the highest reading number is set to a maximum height (or width).

In order to allow the display unit 151 to display a UI object on the contents page, the controller 180 may check the bookmark information and contents information of an e-book to identify (or locate) the contents page. The controller 180 may search keywords such as "table of contents" or "contents," which are suitable for identifying the contents page in the e-book.

Furthermore, the display unit 151 may display a UI object indicating statistical information for each page of the e-book. The display unit 151 may display a UI object indicating statistical information by overlaying the UI object on each page of the e-book. More particularly, the display unit 151 may suitably control the transparency of the UI object to display it on the page.

Furthermore, the display unit 151 may display a UI object indicating statistical information for each e-book on a contents screen including at least one e-book. The display unit 151 may display a UI object indicating statistical information by overlaying it on an UI object representing each e-book (for example, an e-book cover image). More particularly, the display unit 151 may suitably control the transparency of the UI object to display it on the contents screen.

Figure 4:
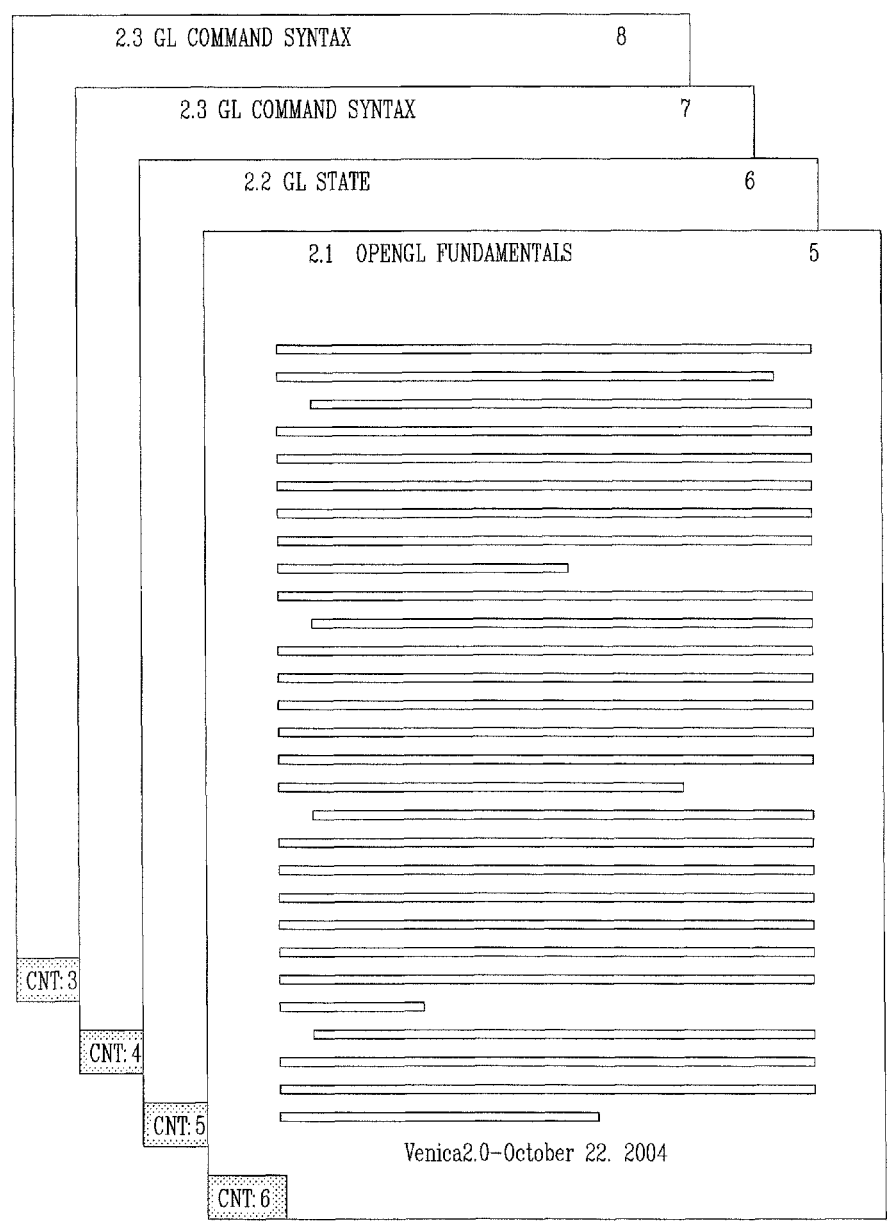
FIG. 4 is a view of pages from the body of an e-book illustrating the number of times that each page has been read using a numeral on each of the pages according to one embodiment of the present invention.

FIG. 4 is a view of a display of a terminal according to an embodiment of the present invention. With reference to FIG. 4, the terminal displays the number of times that each page has been read as a numeral on the body of the page of an e-book. As illustrated in FIG. 4, various pages of the e-book are displayed. Moreover, the number of times that each page has been read may be displayed as a numeral on a portion of the body of the page (e.g., at the lower left corner as illustrated in FIG. 4).

Figure 5:
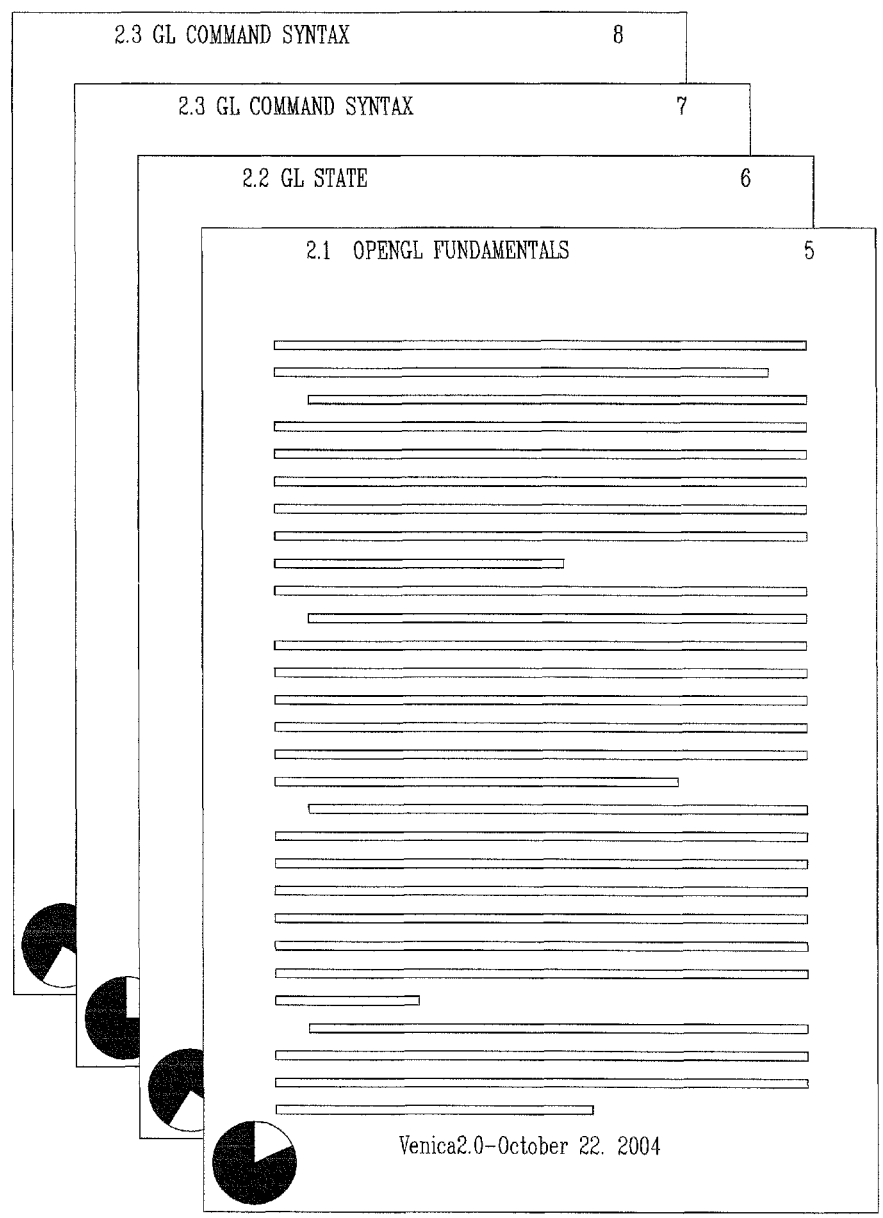
FIG. 5 is a view of pages from the body of an e-book illustrating the number of times that each page has been read using a pie graph on each of the pages according to one embodiment of the present invention.

FIG. 5 is a view of a display of a terminal according to an embodiment of the present invention. With reference to FIG. 5, the terminal displays the number of times that each page has been read as a pie graph on the body of the page of an e-book. As illustrated in FIG. 5, various pages of the e-book are displayed. Moreover, the number of times that the page has been read may be displayed using various types of graphs (e.g., a pie graph as illustrated in FIG. 5) on a portion of the body of the page (e.g., the lower left corner as illustrated in FIG. 5). The pie graph illustrated in FIG. 5 may be displayed according to the number of times that a current page has been read or the reading number of the page that has been read most frequently.

Figure 6:
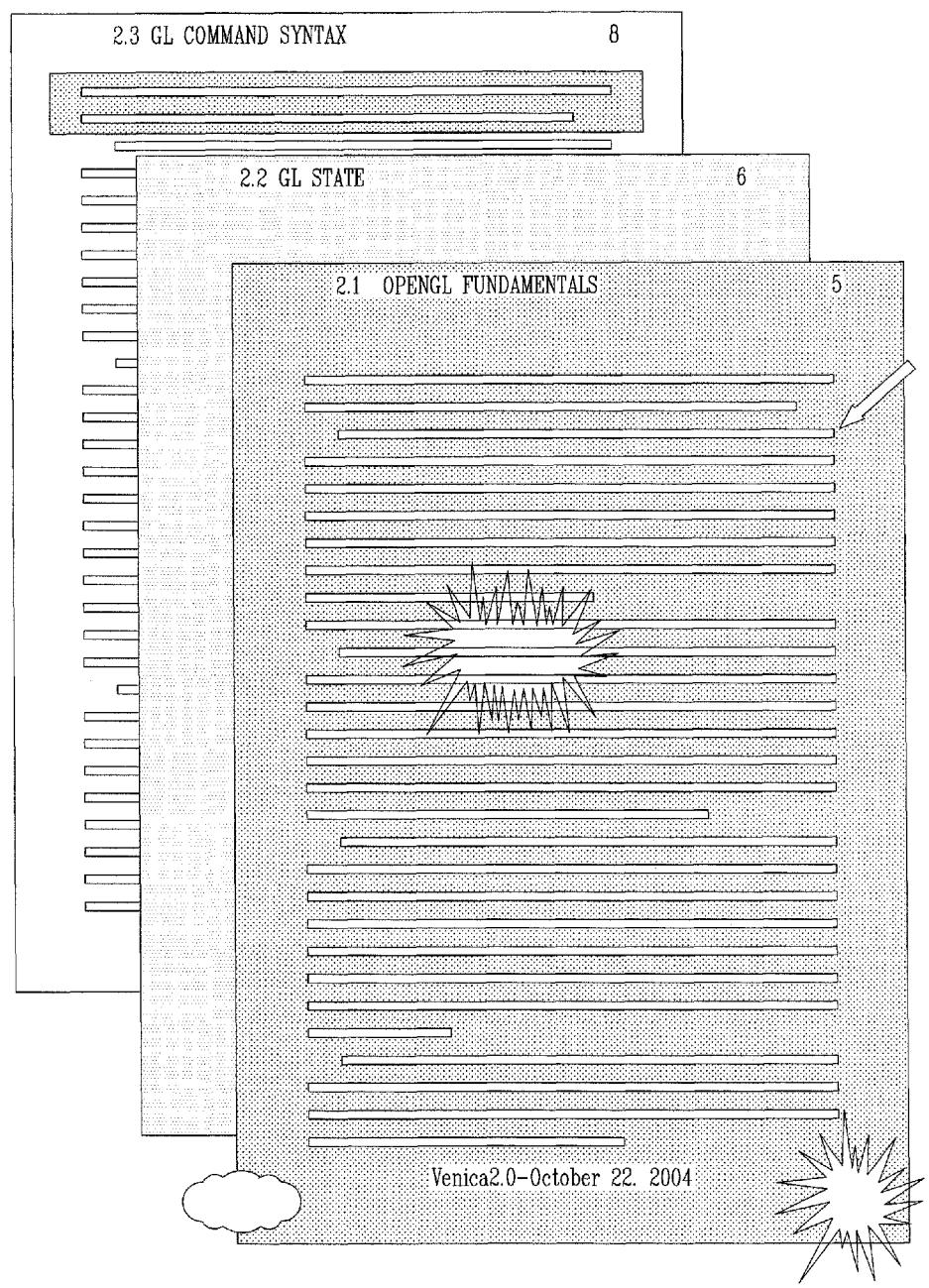
FIG. 6 is a view of pages from the body of an e-book illustrating the number of times that each page has been read using a displayed image or image effect on each of the pages according to one embodiment of the present invention.

FIG. 6 is a view of a display of a terminal according to an embodiment of the present invention. With reference to FIG. 6, the terminal displays an image or image effect corresponding to the number of times that a page or region of the e-book has been read. Various pages of the e-book are displayed. Moreover, an image or image effect corresponding to the number of times that the page has been read may be displayed on the entire page or on a portion of the page. As illustrated in FIG. 6, a rumple effect, color fading effect, or texture effect may be applied on the entire page corresponding to the number of times that a page has been read. Alternatively, various images (or symbols) corresponding to the number of times that a page has been read may be displayed.

The rumple effect, color fading effect, or texture effect may be applied to a region of the screen frequently receiving touch inputs or a region where the e-book page has been frequently displayed. Various images may be displayed on the described effects. In determining the level of a rumple effect, color fading effect, or texture effect, the level of applying the foregoing effect may be determined by using an equation (or mathematical formulation) based on various weight values, e.g., (the reading number*weight_1)*(the reading duration*weight_2).

Furthermore, the display unit 151 may display a UI object indicating statistical information for each portion or location on any page screen or on a separate statistical information screen of the e-book. The portion may be a page or a unit (chapter). The display unit 151 may display a UI object indicating statistical information by overlaying the UI object on a page of the e-book. More particularly, the display unit 151 may suitably control the transparency of the UI object to display it on the page.

Figure 7:
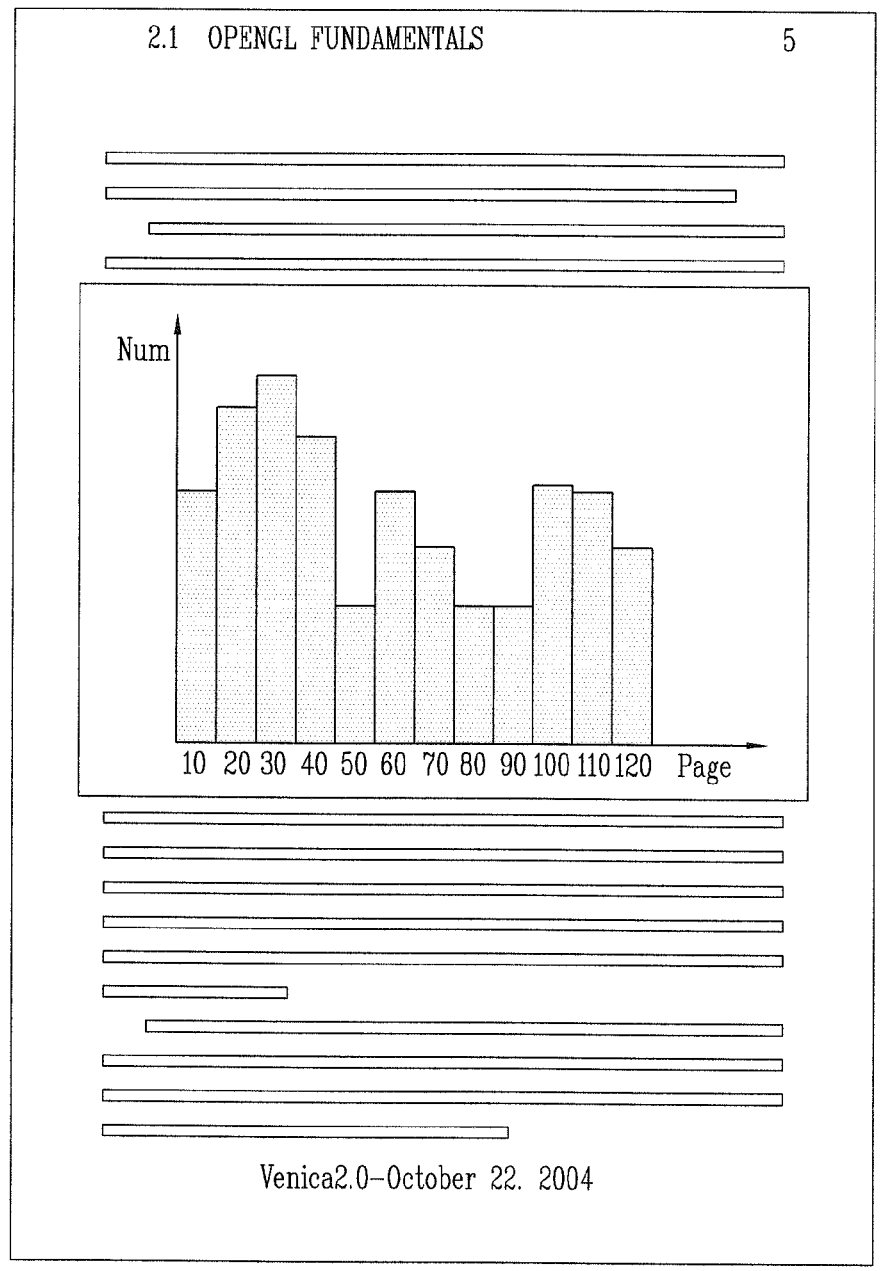
FIG. 7 is a view of a page from the body of an e-book illustrating the number of times that pages of the e-book have been read using a bar graph on the page of the e-book according to one embodiment of the present invention.

FIG. 7 is a view of a display of a terminal according to an embodiment of the present invention. With reference to FIG. 7, the terminal displays a bar graph indicating a reading number for each 10-page unit of an e-book on the body of a page of the e-book. As illustrated in FIG. 7, a page of the e-book is displayed, and a bar graph indicating the reading number for each 10-page unit may be displayed over the page.

Figure 8:
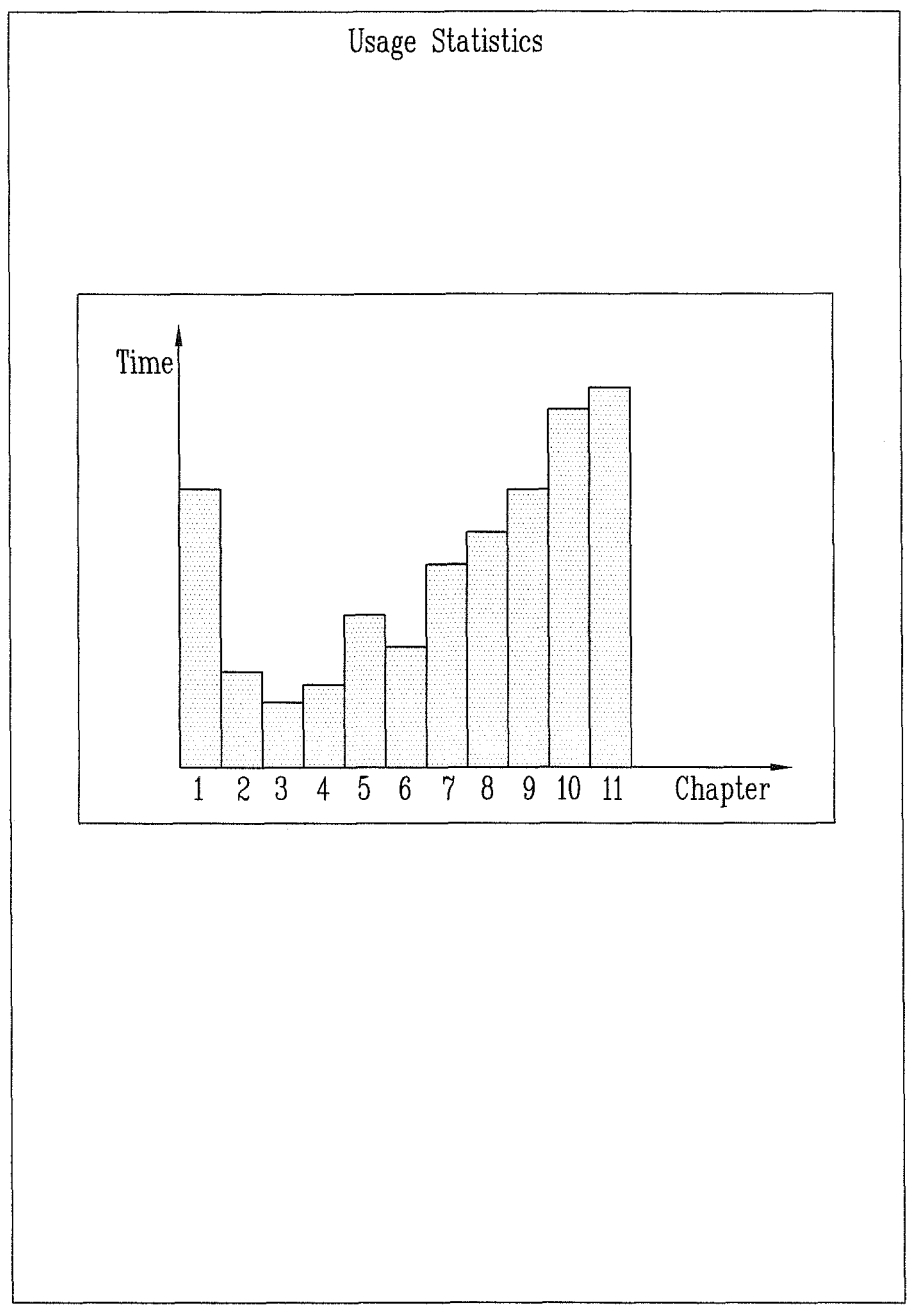
FIG. 8 is a view of a statistical information screen displaying a bar graph illustrating a reading duration for each chapter of an e-book according to one embodiment of the present invention.

FIG. 8 is a view of a display of a terminal according to an embodiment of the present invention. With reference to FIG. 8, the terminal displays a bar graph indicating a reading time for each chapter unit on a statistical information screen. As illustrated in FIG. 8, a bar graph indicating the reading time for each unit (chapter) unit may be displayed by the mobile terminal 100 on the statistical information screen.

Figure 9:
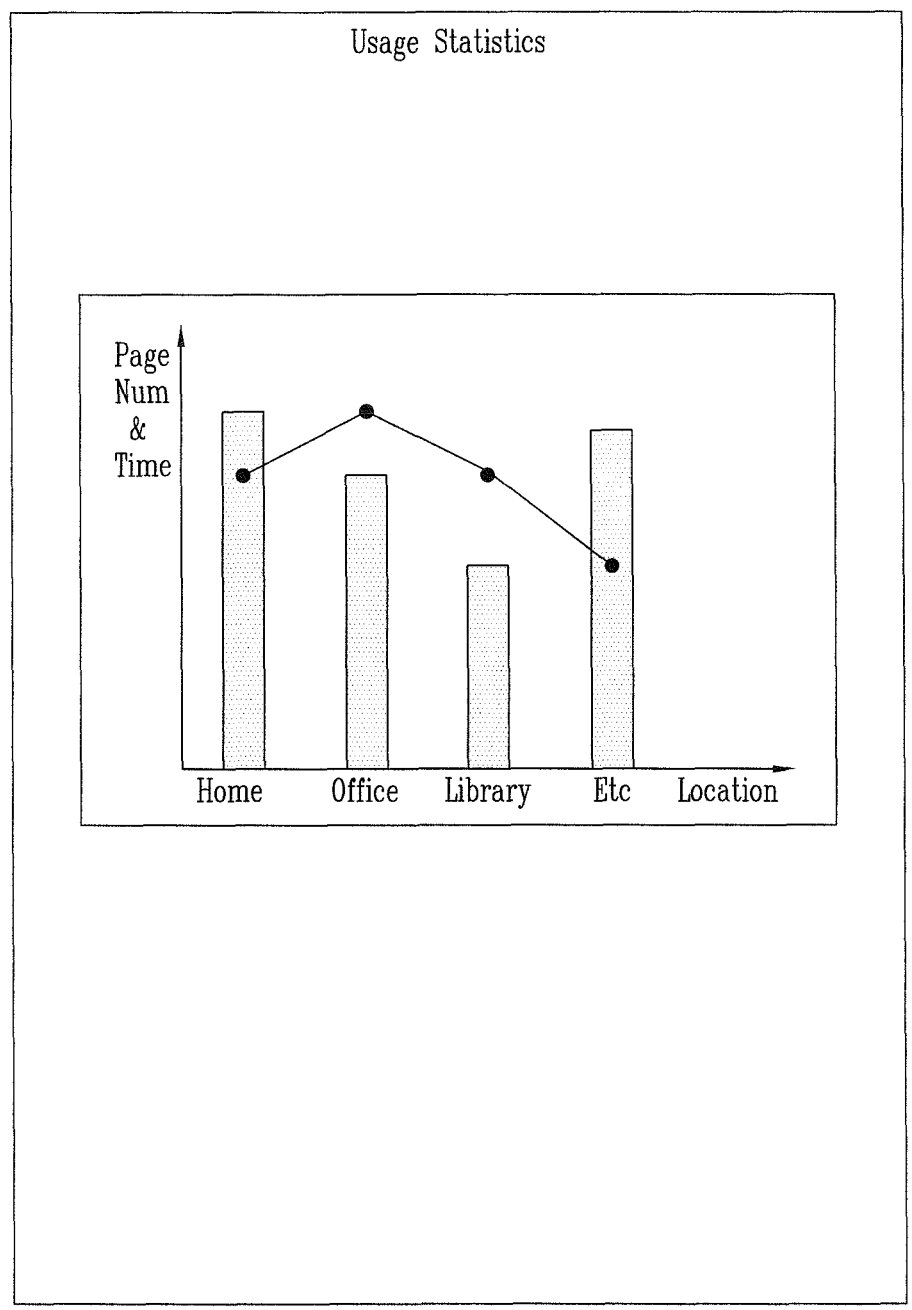
FIG. 9 is a view of a statistical information screen displaying a bar graph indicating the number of read pages and a line graph indicating reading duration for each location according to one embodiment of the present invention.

FIG. 9 is a view of a display of a terminal according to an embodiment of the present invention. With reference to FIG. 9, the terminal displays a bar graph indicating the number of read pages and a line graph (including linear segments) indicating reading times for each location on a statistical information screen. As illustrated in FIG. 9, a bar graph indicating the number of pages that have been read and a line graph indicating the reading time for each location may be displayed by the mobile terminal 100 on the statistical information screen.

Figure 10:
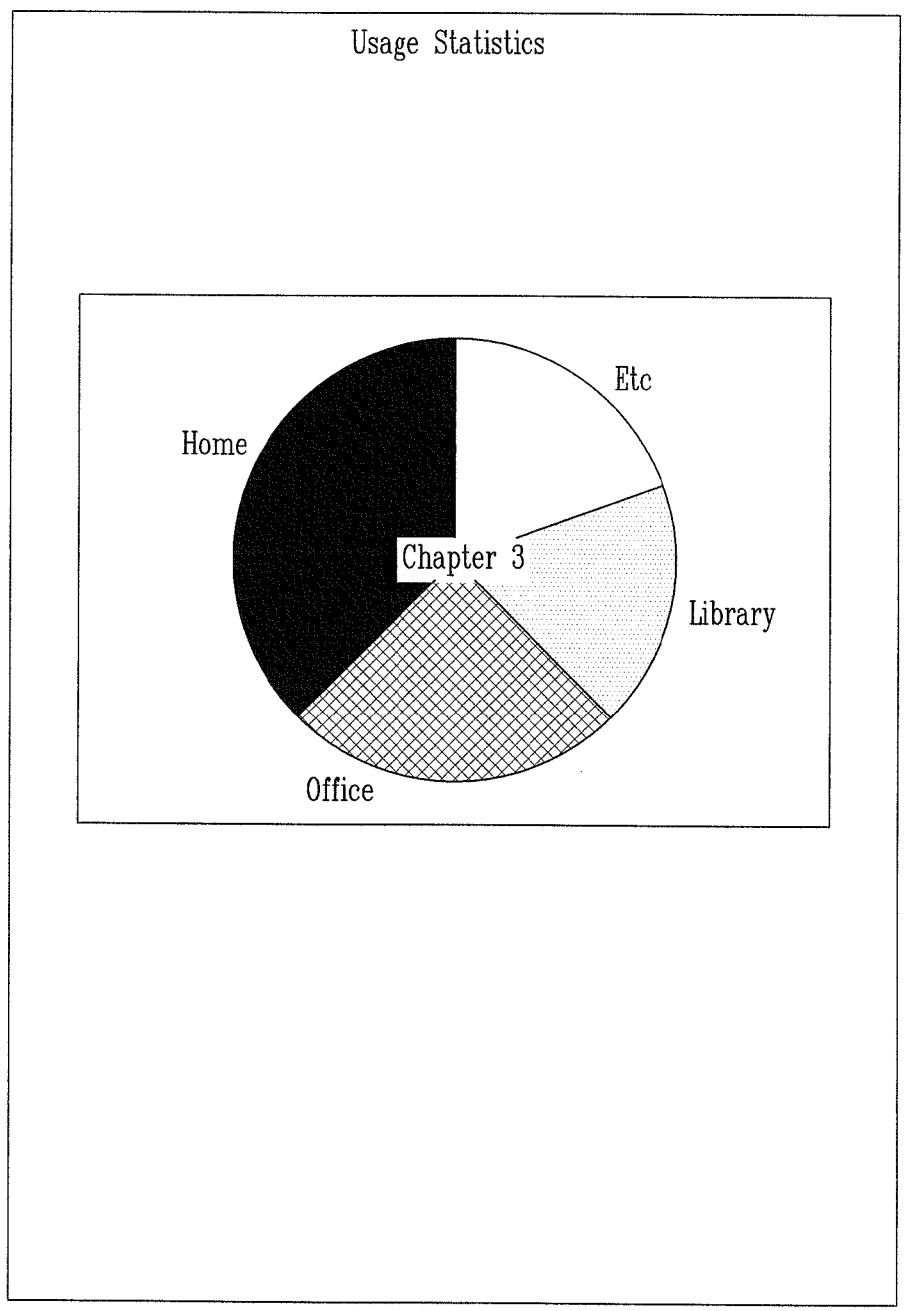
FIG. 10 is a view of a statistical information screen displaying a pie graph indicating location distribution in which a specific unit of the e-book is read according to one embodiment of the present invention.

FIG. 10 is a view of a display of a terminal according to an embodiment of the present invention. With reference to FIG. 10, the terminal displays a pie graph on a statistical information screen indicating location distribution for which a specific unit of the e-book was read. As illustrated in FIG. 10, a pie graph indicating the location distribution for which a specific portion (for example, unit (chapter) 3, as illustrated in FIG. 10) of the e-book has been read may be displayed by the mobile terminal 100 on the statistical information screen.

Figure 11:
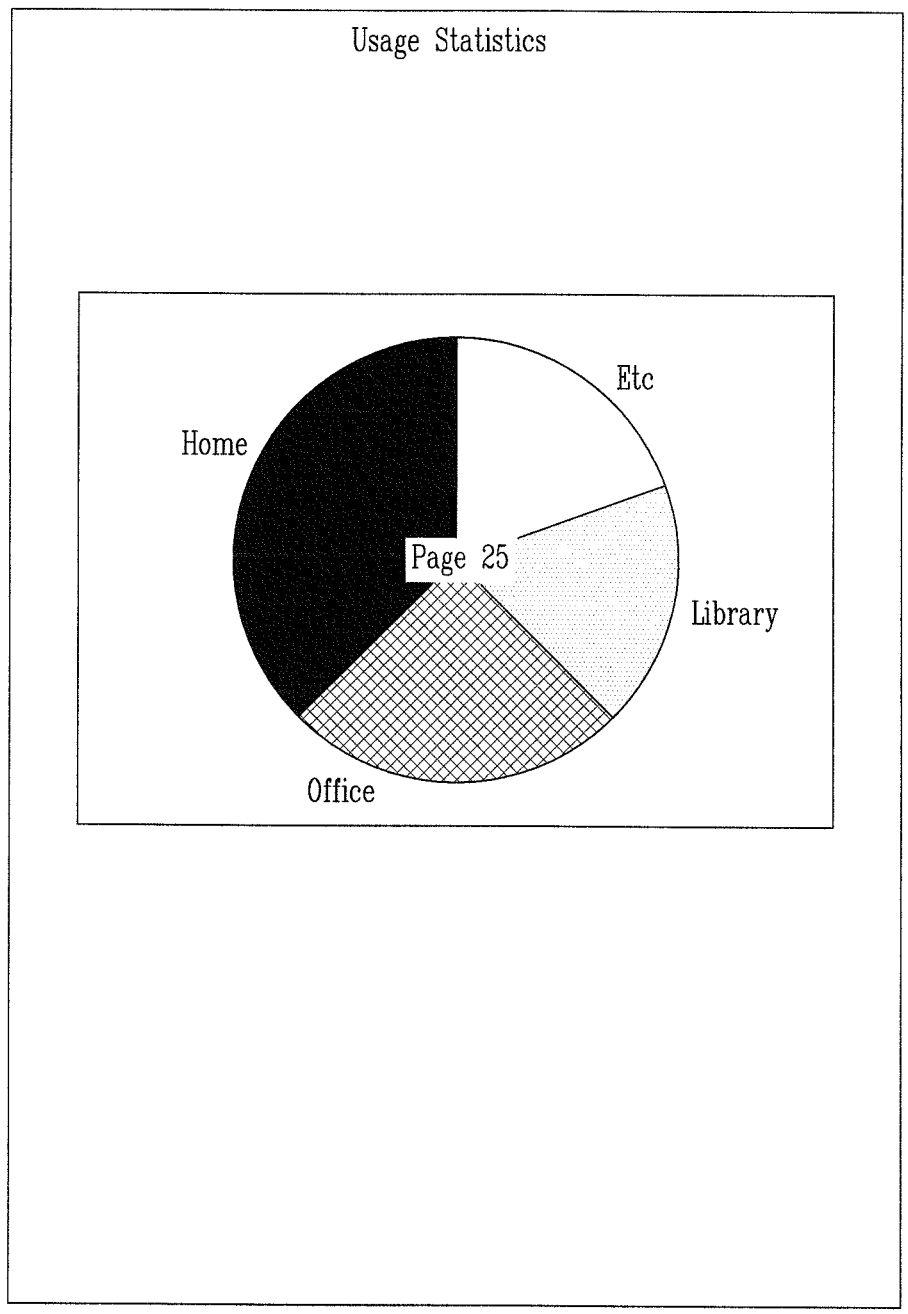
FIG. 11 is a view of a statistical information screen displaying a pie graph indicating location distribution in which a specific page of the e-book is read according to one embodiment of the present invention.

FIG. 11 is a view of a display of a terminal according to an embodiment of the present invention. With reference to FIG. 11, the terminal displays a pie graph on a statistical information screen indicating a location distribution (e.g., a distribution of the locations) in which a specific page of the e-book is read. As illustrated in FIG. 11, a pie graph indicating the location distribution in which a specific portion (for example, page 25 in FIG. 11) of the e-book has been read may be displayed by the mobile terminal 100 on the statistical information screen.

Furthermore, the display unit 151 may display a UI object indicating statistical information for each portion of an e-book. The UI object may be displayed on a list screen including at least one e-book, a separate statistical information screen for the e-book selected or currently read by the user, or an initial screen (for example, a screen displaying an e-book cover image) for a e-book that is selected by the user and is loaded and displayed. The portion of the e-book may be a page, or a unit (chapter).

The display unit 151 may display a UI object indicating statistical information by overlaying it on the screen. More particularly, the display unit 151 may suitably control the shade, graph, color, or transparency of the UI object to display the UI object on the underlying page. When there is a user selection (for example, touch input) for a UI object displayed by the display unit 151 (touch screen), the controller 180 controls the display unit 151 to display the content or text of the relevant page or the relevant unit (chapter) corresponding to the UI object.

Figure 12:
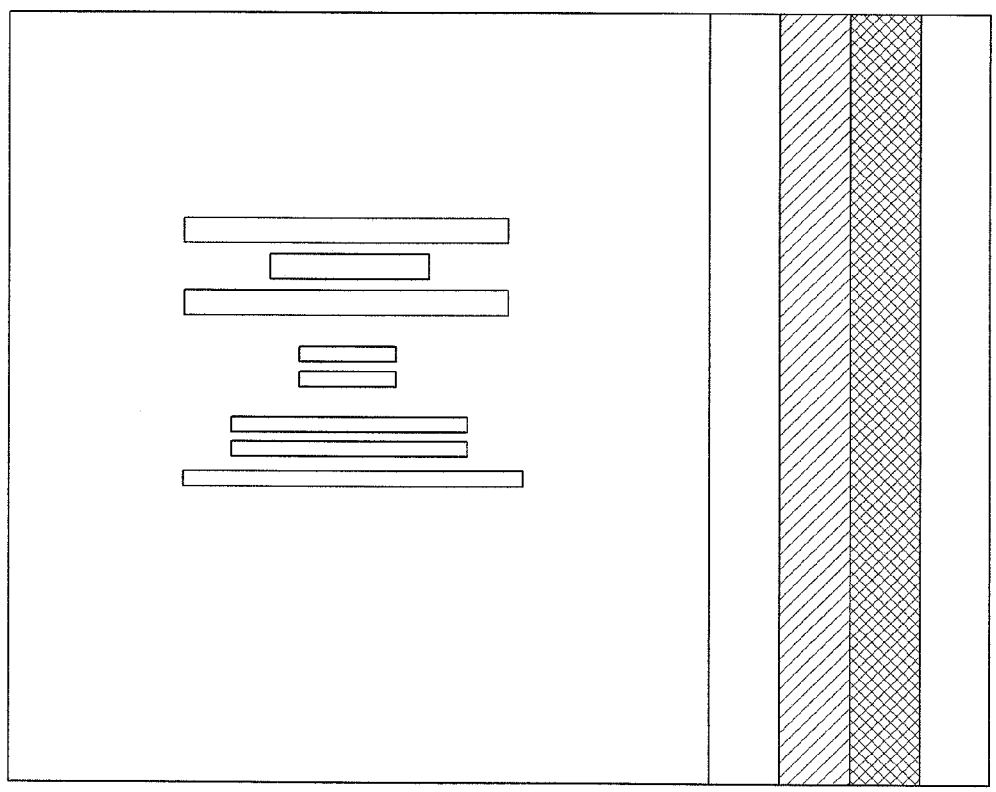
FIG. 12 is a view illustrating that a terminal displays on a statistical information screen a shaded graphic indicating a reading number or reading duration for each page unit next to an e-book cover image according to one embodiment of the present invention.

FIG. 12 is a view of a display of a terminal according to an embodiment of the present invention. With reference to FIG. 12, the terminal displays a shaded graphic on a statistical information screen indicating a reading number or reading duration for each page unit next to an e-book cover image.

As illustrated in FIG. 12, a rectangular-shaped image (or graphic) corresponding to whole pages of an e-book is displayed on a separate statistical information screen next to an e-book cover image of an e-book selected or currently read by the user. The image (or graphic) is divided into units of a predetermined number of pages, and the divided portions may be shaded according to the reading number or reading time for the corresponding pages. In FIG. 12, a darker shaded portion corresponds to a unit that has been read more frequently or longer than a unit corresponding to a lighter shaded portion.

Alternatively, a pie graph corresponding to whole pages of an e-book is displayed on a separate statistical information screen next to an e-book cover image of an e-book selected or currently read by the user. The pie graph is divided into units of a predetermined number of pages, and the divided portions may be shaded according to the reading number or reading time for the corresponding pages. As described earlier, when there is a user selection (for example, by touch input) for any one of the divided portions displayed by the display unit 151 (touch screen), the controller 180 controls the display unit 151 to display the content or text of the relevant page or the relevant unit (chapter) corresponding to the selected portion.

Figure 13:
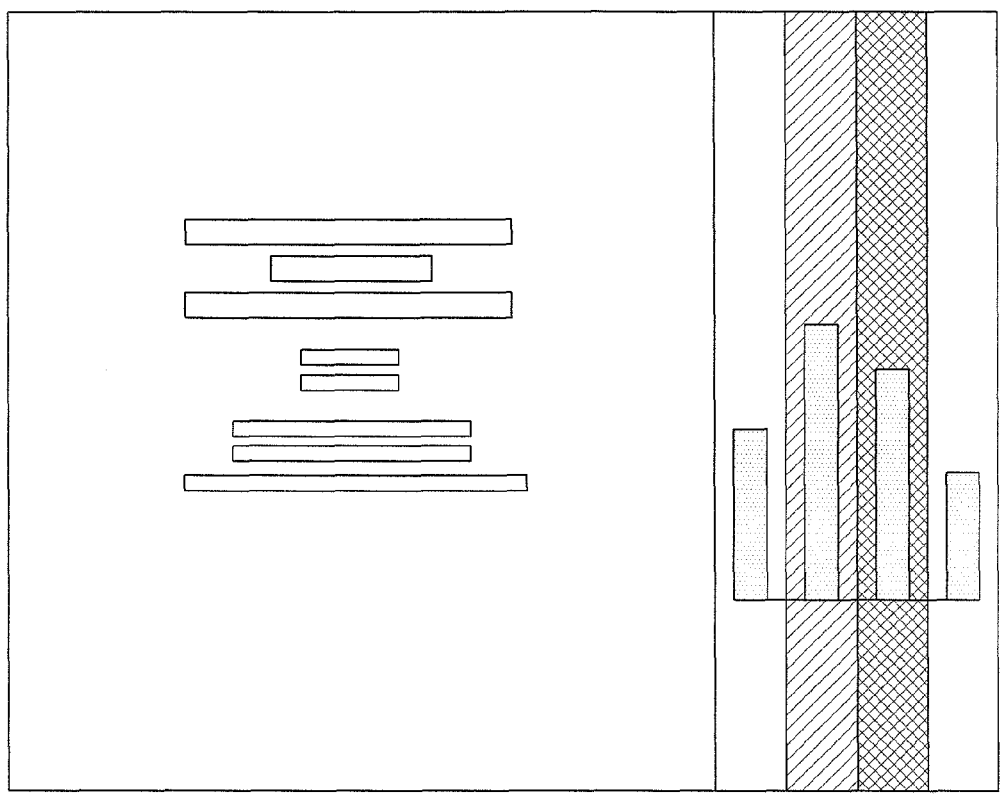
FIG. 13 is a view illustrating that a terminal displays on a statistical information screen a shaded graphic indicating a reading number or reading duration for each unit next to an e-book cover image according to one embodiment of the present invention.

FIG. 13 is a view of a display of a terminal according to an embodiment of the present invention. With reference to FIG. 13, the terminal displays a shaded graphic on a statistical information screen indicating a reading number or reading time for each unit next to an e-book cover image.

As illustrated in FIG. 13, a rectangular image corresponding to whole units (chapters) is displayed on a separate statistical information screen next to an e-book cover image of an e-book selected or currently read by the user. The image is divided according to units (e.g., chapters), and a bar graph may be displayed according to the reading number or reading time for the corresponding unit (chapter) in each divided portion of the image.

In FIG. 13, a higher (or taller) displayed bar graph corresponds to a unit that has been read more frequently or longer than a unit corresponding to a shorter bar graph. As described earlier, when there is a user selection (for example, by touch input) for any one of the bars in a bar graph displayed by the display unit 151 (touch screen), the controller 180 controls the display unit 151 to display the content or text of the relevant page or the relevant unit (chapter) corresponding to the selected bar.

Figure 14:
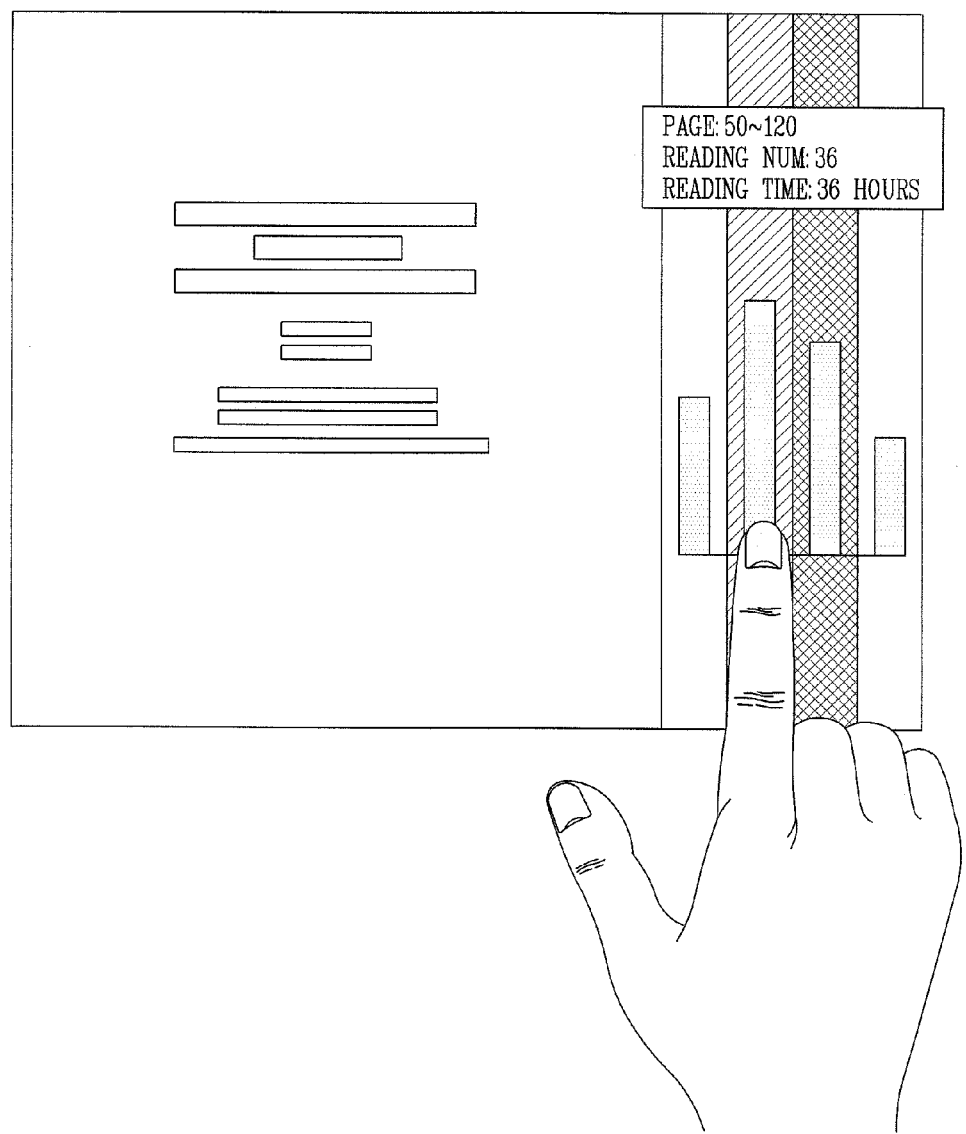
FIG. 14 is a view illustrating that a terminal displays on a statistical information screen a page number range, a reading number and a reading duration for pages corresponding to the selected bar of a bar graph bar according to one embodiment.

FIG. 14 is a view of a display of a terminal according to an embodiment of the present invention. With reference to FIG. 14, the terminal displays a page number range, a reading number and a reading time on a statistical information screen for pages corresponding to the selected bar of a bar graph bar. As illustrated in FIG. 14, when any one of the bars in a bar graph (see, e.g., the bar graph of FIG. 13) is selected, a page number range, a reading number, and/or a reading time for pages corresponding to the selected bar may be additionally displayed.

If the reading number or reading time for any page of the e-book is greater than a predetermined number or a predetermined time, respectively, then the display unit 151 may display a predetermined photo, image, background image, character, or icon. The display unit 151 may overlay it on the relevant page. More particularly, the display unit 151 may suitably control the transparency of the photo, image, background image, character or icon to display it on the page.

If the pages of an e-book are renumbered as a whole by the reflowing of the e-book, then the controller 180 calculates the corresponding proportional relation between the original page and the reflowed page, and properly modifies statistical information according to the reflowed page. The various statistical information for e-book usage histories is generated based on metadata read from the memory 160.

Then, the controller 180 generates a UI object corresponding to the modified statistical information. If the controller 180 transmits the generated UI object, then the display unit 151 visually displays the transmitted UI object.

The display unit 151 may not display a UI object selected by the user among the UI objects currently being displayed. For example, if a touch input is maintained for more than a predetermined time on any one UI object, then the display unit 151 (touch screen) may display a menu screen including a display-excluded item, and may not display the UI object if a display-excluded item is selected.

Contents Filtering Function Based on Metadata

As described previously, the controller 180 reads a metadata-related setup stored in the memory 160, and stores or updates in the memory 160 metadata for e-book usage history according to the metadata-related setup. The controller 180 chooses a portion or e-book satisfying a predetermined filtering condition based on metadata read from the memory 160, and the display unit 151 visually displays, for example, the chosen portion or e-book. The filtering condition may be given in the form of a logic operation (using, for example, AND, OR, NOT, etc.) having a plurality of conditions, and the portion may be a region, a page, or a unit (chapter).

The filtering condition may be given by the user, and for this purpose, a typical process may be performed in which the display unit 151 displays a filtering condition window, and the user input unit 130 or display unit 151 (touch screen) receives the user selection to transmit the received data to the controller 180. For example, the controller 180 may display a filtering menu including option items corresponding to e-book history information or metadata, and visually display the reading item of the chosen e-book based on the selected option item.

As an example, the controller 180 may search metadata stored for each page of the e-book, and accordingly perform filtering on pages to choose from that have been read more than a predetermined number of times or for longer than a predetermined time, or perform filtering on pages to choose from that have not been read at all. The controller 180 may display only the chosen pages satisfying the filtering condition.

As another example, the controller 180 may search metadata stored for each page of the e-book including travel information, and accordingly perform filtering on pages to choose from in which video content is inserted, underline is inserted by the user, and which have been read more than five times. The controller 180 may display only the chosen pages satisfying the filtering condition.

As another example, the controller 180 may search metadata stored for each region of the e-book including study information, and accordingly perform filtering on regions to choose them in which highlight is inserted by the user, which are enlarged by the user, which have been read at a library, and which have been read for more than two hours. The controller 180 may display only the chosen regions satisfying the filtering condition.

Metadata Transmission Function

As described previously, the controller 180 reads a metadata-related setup stored in the memory 160, and stores or updates in the memory 160 metadata for e-book usage history according to the metadata-related setup.

If the controller 180 specifies all or part of metadata read from the memory 160, then the wireless communication unit 110 may transmit the specified metadata to a predetermined metadata server for transfer to another user, or directly transmit the specified metadata to the mobile terminal of another user, as described earlier. If the controller 180 specifies a kind of metadata to be received from another user, then the wireless communication unit 110 may receive the specified metadata from a predetermined metadata server, or directly receive the specified metadata from the mobile terminal of another user, as described earlier.

Metadata to be provided to another user or metadata to be received from another user may be specified by the user. For this purpose, a typical process may be performed in which the display unit 151 displays a specification window, and the user input unit 130 or the display unit 151 (touch screen) receives the user selection in order to transmit the received data to the controller 180.

Furthermore, if the controller 180 generates various statistical information for e-book usage histories based on metadata read from the memory 160, or generates various UI objects (user interface object, UI constituent element) corresponding to the generated statistical information, then the wireless communication unit 110 may transmit the specified statistical information or specified UI object to a predetermined metadata server in order to transfer it to another user, or directly transmit the specified statistical information or specific UI object to the mobile terminal of another user. For example, the wireless communication unit 110 may transmit statistical information currently being displayed on the display unit 151 or an UI object corresponding to the statistical information to a predetermined metadata server or the mobile terminal of another user.

It is understood that a process of receiving statistical information from another user may be similar to the above-described transmission of statistical information to another user. Therefore, further details regarding the reception of statistical information will not be provided.

Metadata Management Function

As described earlier, the controller 180 reads a metadata-related setup stored in the memory 160, and stores or updates in the memory 160 metadata for e-book usage history according to the metadata-related setup. The controller 180 may delete all or part of the metadata stored in the memory. The kind of metadata subject to deletion has been described previously with respect to the metadata setup function, and, thus, further details in this regard will not be provided.

Metadata to be deleted may be specified by the user. For this purpose, a typical process may be performed in which the display unit 151 displays a deletion window, and the user input unit 130 or the display unit 151 (touch screen) receives the user selection in order to transmit the received data to the controller 180.

Alternatively, the controller 180 may delete metadata corresponding to the statistical information or UI object currently being displayed on the display unit 151. For example, the display unit 151 (touch screen) may display a menu screen including an option whereby an item is deleted if a touch input is maintained for more than a predetermined time on a corresponding UI object. The controller 180 may delete metadata corresponding to the UI object if the delete item option is selected.

Figure 15:
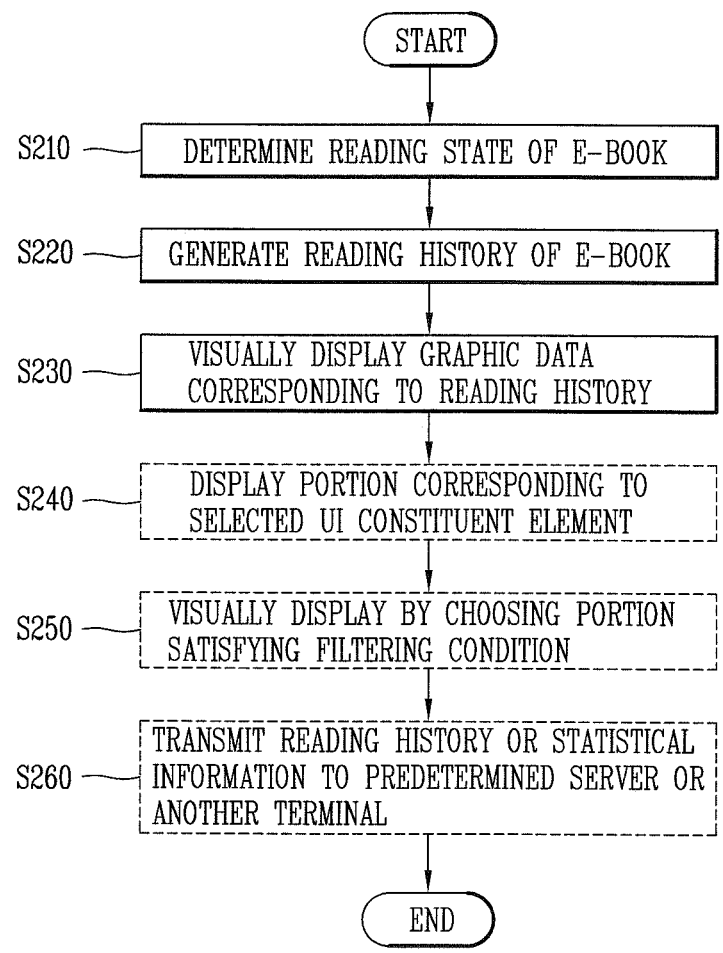
FIG. 15 is a flow chart illustrating a method of managing the usage history of an e-book according to an embodiment of the present invention.

FIG. 15 is a flow chart illustrating a method of managing the usage history of an e-book according to an embodiment of the present disclosure. Referring to FIG. 15, the controller 180 may determine the reading state of an e-book (S210). In particular, the controller 180 may determine whether a condition for storing the reading history of the e-book is satisfied. Hereinafter, the process of determining whether a condition for storing the reading history of the e-book will be described, by way of example, with reference to determining the reading state of the e-book.

Figure 16:
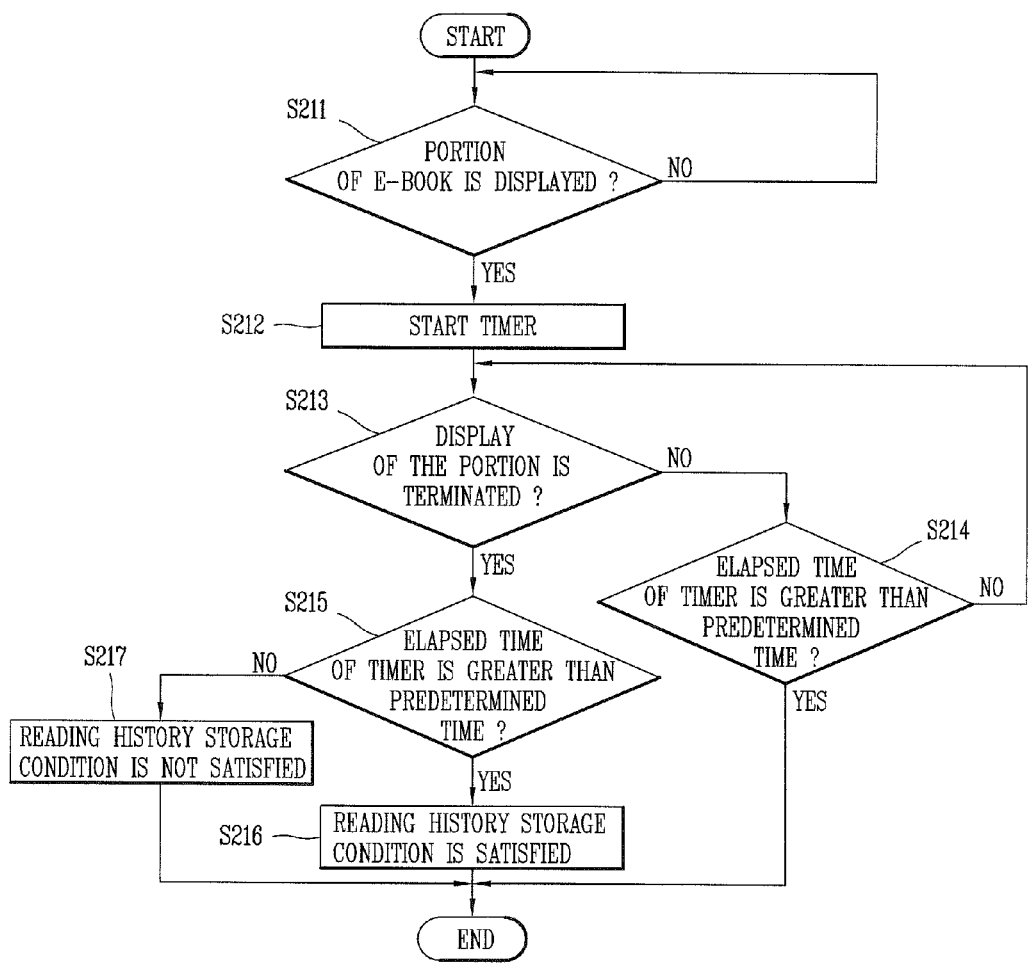
FIG. 16 is a flow chart illustrating a determination of the reading state of an e-book in a method of managing the usage history of the e-book according to an embodiment of the present invention.

FIG. 16 is a flow chart illustrating an example for determining the reading state of an e-book (S210) according to an embodiment of the present invention. Referring to FIG. 16, the controller 180 determines whether any portion of an e-book is displayed (S211), and starts a timer when the display is started (S212). The portion may be a page of the e-book.

The controller 180 determines whether the display of the portion has been terminated by a user input (key input, button input or touch input) (S213). If the display is not terminated (i.e., the display is maintained), the controller 180 determines whether the elapsed time of the timer (e.g., the value of the timer) is greater than a predetermined time. If the elapsed time of the timer is greater than a predetermined time, then the controller 180 determines that a condition is satisfied for storage of the reading history (S216). Otherwise, the controller 180 continues to determine whether the display of the portion has been terminated by a user input (S213).

If the display of the portion is terminated, then the controller 180 determines whether the elapsed time of the timer is greater than a predetermined time (S215). If the elapsed time of the timer is greater than a predetermined time, then the controller 180 determines that a condition is satisfied for storage of the reading history (S216). Otherwise, the controller 180 determines that the condition is not satisfied, and the reading history is not stored (S217).

Returning to FIG. 15, the controller 180 generates a reading history of the e-book based on the determined reading state of the e-book (S220). The reading history may be generated for each portion of the e-book. Hereinafter, the process of generating reading histories for each portion of the e-book will be described as an example.

Figure 17:
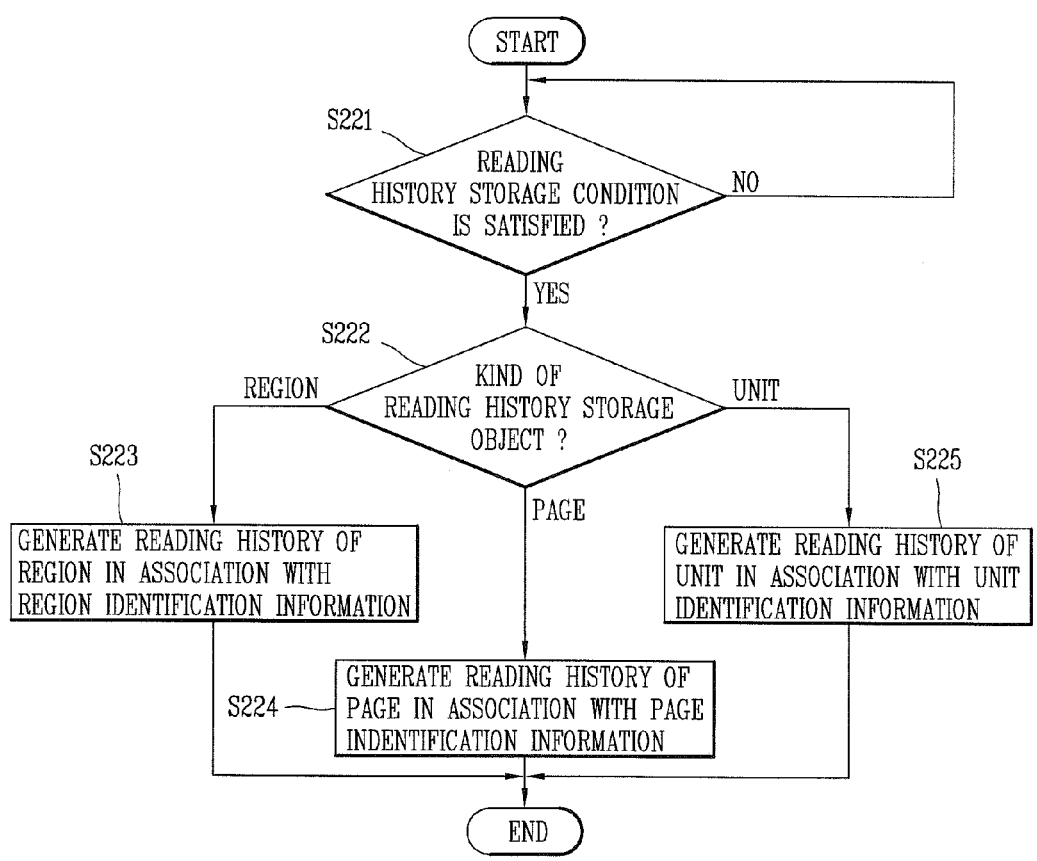
FIG. 17 is a flow chart illustrating the generation of the reading history of an e-book in a method of managing the usage history of the e-book according to an embodiment of the present invention.

FIG. 17 is a flow chart illustrating an example for generating the reading history of an e-book (S220) according to an embodiment of the present invention. Referring to FIG. 17, the controller 180 checks whether a condition is satisfied for storage of the reading history (S221).

If the condition is not satisfied, the controller 180 continues to check whether a condition is satisfied for storage of the reading history (S221). If the condition is satisfied, the controller 180 determines whether an object for which the reading history of the e-book is to be stored is a region, a page, or a unit (chapter) (S222). The type of the object for which the reading history of the e-book is to be stored may be configured in advance by the user.

If the object for which the reading history of the e-book is to be stored is a region, then the controller 180 generates a reading history of the region (for example, a reading number, a reading time, a reading duration, or a reading location) in association with information identifying the region (for example, a number of a page where the region is located, or a plurality of coordinates identifying the location occupied by the region in the page) (S223).

If the object for which the reading history of the e-book is to be stored is a page, then the controller 180 generates a reading history of the page (for example, a reading number, a reading time, a reading duration, or a reading location) in association with information identifying the page (for example, a number of the page) (S224).

If the object for which the reading history of the e-book is to be stored is a unit (chapter), then the controller 180 generates a reading history of the unit (for example, a reading number, a reading time, a reading duration, a reading location) in association with information identifying the unit (for example, a number of the unit) (S225).

Returning to FIG. 15, the controller 180 visually displays graphic data corresponding to the reading history (S230). Specifically, the controller 180 may generate statistical information based on the reading history of the e-book and generate the graphic data corresponding to the generated statistical information.

The controller 180 may visually display the graphic data corresponding to the reading history generated for each portion of the e-book. For example, the controller 180 may display a UI constituent element corresponding to the statistical information based on the reading history generated for each page or each unit of the e-book by overlaying the UI constituent element on the contents page of the e-book. Alternatively, the controller 180 may display a UI constituent element corresponding to the statistical information based on the reading history generated for each page of the e-book by overlaying the UI constituent element on each page of the e-book. Hereinafter, the process of allowing the controller 180 to visually display the graphic data corresponding to the reading history generated for each portion of the e-book will be described.

Figure 18:
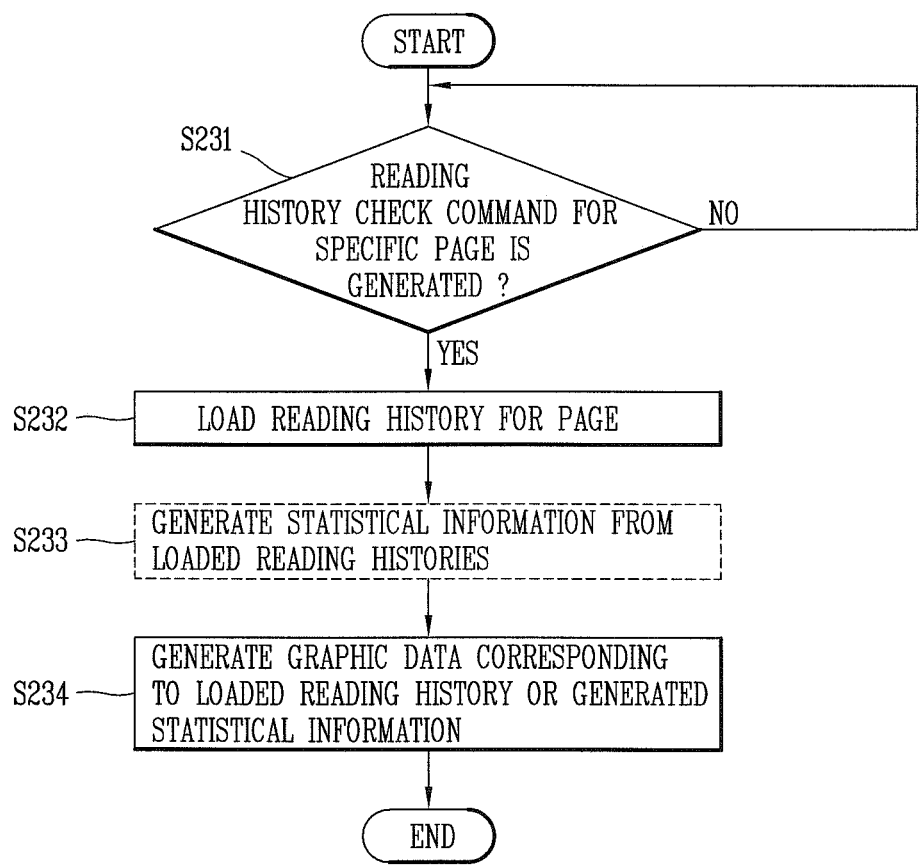
FIG. 18 is a flow chart illustrating the display of graphic data corresponding to the reading history generated for each portion of an e-book in a method of managing the usage history of the e-book according to an embodiment of the present invention.

FIG. 18 is a flow chart illustrating an example of visually displaying graphic data corresponding to the reading history generated for each portion of an e-book *S230) according to an embodiment of the present invention. Referring to FIG. 18, the controller 180 determines whether a reading history check command for a specific page of the e-book has been generated by a user input (key input, button input, touch input) (S231).

If the reading history check command for a specific page has been generated, the controller 180 loads the reading history for the page among the reading histories set to be displayed in advance by the user (S232). The reading histories set to be displayed in advance by the user may include a reading number, a reading time, a reading timing, or a reading location.

Additionally, the controller 180 may generate a more complicated type of statistical information from the loaded reading histories (S233). For example, if the user instructs to check a reading location for the page and a reading time at the reading location, then the controller 180 may generate a reading location list for the page and check the reading time details for each reading location in order to calculate a sum of the reading times.

The controller 180 generates graphic data corresponding to the loaded reading history or generated statistical information (S234). Typically, the graphic data may be a numeral, text, a graph, or a chart corresponding to the statistical information.

Returning to FIG. 15, the controller 180 may display a page or unit corresponding to the UI constituent element if there is a user selection of the UI constituent element in which the graphic data is visually displayed (S240). Furthermore, the controller 180 may choose a portion of the e-book satisfying a filtering condition. The selection may be generated based on the reading history of the e-book in order to visually display it (S250). Furthermore, the controller 180 may transmit the reading history of the e-book or the statistical information generated based on the reading history of the e-book to a predetermined server or another terminal (S260).

It is understood that a method of managing the usage history of an e-book has been described with reference to various embodiments relating to terminals (see, e.g., FIGS. 1 through 14). According to an embodiment of the present invention, the foregoing method may be implemented as codes readable by a computer on a medium.

Examples of the computer-readable media may include ROM, RAM, CD-ROM, magnetic tape, floppy disk, and an optical data storage device. Examples of the computer-readable media may also include a device implemented via a carrier wave (for example, a transmission via the Internet).

The configurations and methods according to the embodiments described herein are not limited to the disclosed mobile terminal. All or part of each embodiment may be selectively combined and configured to make various modifications thereto. Terms and words used herein and the claims should not be construed by limiting such terms to their typical or lexical meaning, but should be construed based on the meaning and concept conforming to the technical spirit of the present disclosure.

Accordingly, the configurations illustrated in the embodiments disclosed herein are merely configurations according to embodiments of the present invention. It is not intended that the disclosed embodiments represent the entire technical spirit of the present disclosure. Therefore, it is understood that various equivalents and modifications may be implemented as substitutes for various features.

What is claimed is:

1. A method of managing a usage history of a mobile terminal, the method comprising:
   displaying, on a display of the mobile terminal, a first page among a plurality of pages of an e-book;
   recognizing a first touch input for selecting a first region of the first page and a second touch input for selecting a second region of the first page;
   displaying the first page among the plurality of pages with a first image effect reflecting a first number of times that the first region has been selected based on first metadata and a second image effect reflecting a second number of times that the second region has been selected based on second metadata in response to a first request for displaying the first page, wherein the first image effect is displayed on the first region of the first page based on the first metadata, and wherein the second image effect is displayed on the second selected region of the first page based on the second metadata; and
   wherein if the first number of times is different from the second number of times, the first image effect and the second image effect each comprises an image having a different level or a different image, and
   wherein the first image effect and the second image effect are each overlapped on the first selected region and the second selected region, respectively, with a transparency such that first contents of the first region and second contents of the second region are visible,
   wherein the first metadata identifying the first region of the first page selected in response to the first touch input comprises:
      the first number of times that the first region has been selected; and
      a page number corresponding to the first page in which the first region is included, a position of the first region on the first page indicated by a plurality of coordinates, and first location information,
   wherein the second metadata identifying the second region of the first page selected in response to the second touch input comprises:
      the second number of times that the second region has been selected; and
      a page number corresponding to the first page in which the second region is included, a position of the second region on the first page indicated by a plurality of coordinates, and second location information,
   wherein the method further comprises:
      receiving current location information regarding a current location of the mobile terminal; and
      comparing the current location information with the first location information and the second location information, and
   wherein the first page is displayed based on a result of the comparing reflecting:
      the first number of times that the first region has been selected when the first page has been displayed at a location within a predetermined range from a location specified by the first location information of the first metadata; and
      the second number of times that the second region has been selected when the first page has been displayed at a location within a predetermined range from a location specified by the second location information of the second metadata.

2. The method of claim 1, wherein usage history information is generated for each of a plurality of reading items of the e-book, the usage history information comprising the first metadata and the second metadata.

3. The method of claim 2, wherein each of the plurality of reading items comprises at least a region, a page or a unit of the e-book.

4. The method of claim 2, wherein prior to the storing of the first metadata and the second metadata, the usage history information is generated when a usage history information generation condition is satisfied.

5. The method of claim 4, wherein the usage history information generation condition corresponds to whether a specific reading region of the e-book is displayed for more than a predetermined time.

6. The method of claim 4, wherein the usage history information generation condition corresponds to whether a number of user inputs generated in a specific region of the e-book is greater than a predetermined number.

7. The method of claim 1, further comprising:
generating at least a number of reading, a reading time, a reading duration, an indicator regarding a selected region, a displayed region, or an inserted multimedia object.

8. The method of claim 1, wherein the first image effect and the second image effect comprise at least a rumple effect, a color fading effect or a texture effect.

9. The method of claim 1, wherein the first region and the second region of the first page are located at different partial portions of the first page.

10. The method of claim 9, wherein the plurality of coordinates indicating the location of the second region on the first page is different from the plurality of coordinates indicating the location of the first region on the first page.

11. A mobile terminal comprising:
a touch screen;
a memory;
a position location module for acquiring current location information of the mobile terminal; and
a controller configured to:
cause the touch screen to display a first page among a plurality of pages of an e-book;
recognize a first touch input for selecting a first region of the first page;
cause the memory to store first metadata identifying the first region of the first page selected in response to the first touch input, the first metadata comprising:
a first number of times that the first region has been selected; and
a page number corresponding to the first page in which the selected first region is included, a position of the selected first region on the first page indicated by a plurality of coordinates, and first location information;
recognize a second touch input for selecting a second region of the first page, wherein the first region and the second region are different from each other;
cause the memory to store second metadata identifying the second region of the first page selected in response to the second touch input, the second metadata comprising:
a second number of times that the second region has been selected; and
a page number corresponding to the first page in which the selected second region is included, a position of the selected second region on the first page indicated by a plurality of coordinates, and second location information;
cause the touch screen to display the first page among the plurality of pages with a first image effect reflecting the first number of times based on the first metadata and a second image effect reflecting the second number of times based on the second metadata in response to a first request for displaying the first page, wherein the first image effect is displayed on the first region of the first page based on the first metadata, and wherein the second image effect is displayed on the second region of the first page based on the second metadata; and
wherein if the first number of times is different from the second number of times, each of the first image effect and the second image effect each comprises an image having a different level or a different image, and
wherein the first image effect and the second image effect are each overlapped on the first selected region and the second selected region, respectively, with a transparency such that first contents of the first region and second contents of the second region are visible,
wherein the controller is further configured to:
receive current location information regarding a current location of the mobile terminal; and
compare the current location information with the first location information and the second location information, and
wherein the first page is displayed based on a result of the comparing reflecting:
the first number of times that the first region has been selected when the first page has been displayed at a location within a predetermined range from a location specified by the first location information of the first metadata; and
the second number of times that the second region has been selected when the first page has been displayed at a location within a predetermined range from a location specified by the second location information of the second metadata.

12. The mobile terminal of claim 11, wherein usage history information is generated for each of a plurality of reading items of the e-book, the usage history information comprising the first metadata and the second metadata.

13. The mobile terminal of claim 12, wherein each of the plurality of reading items comprises at least a region, a page or a unit of the e-book.

14. The mobile terminal of claim 12, wherein prior to the storing of the first metadata and the second metadata, the controller is further configured to generate the usage history information when a usage history information generation condition is satisfied.

15. The mobile terminal of claim 14, wherein the usage history information generation condition corresponds to whether a specific reading region of the e-book is displayed for more than a predetermined time.

16. The mobile terminal of claim 14, wherein the usage history information generation condition corresponds to whether a number of user inputs generated in a specific region of the e-book is greater than a predetermined number.

17. The mobile terminal of claim 11, wherein the controller is further configured to generate at least a number of reading, a reading time, a reading duration, an indicator regarding a selected region, a displayed region, or an inserted multimedia object.

18. The mobile terminal of claim 11, wherein each of the first image effect and the second image effect comprises at least a rumple effect, a color fading effect or a texture effect.

* * * * *